(12) United States Patent
Arjunan et al.

(10) Patent No.: US 7,439,312 B2
(45) Date of Patent: Oct. 21, 2008

(54) BRANCHED CRYSTALLINE POLYPROPYLENE

(75) Inventors: Palanisamy Arjunan, Houston, TX (US); Thottinal A. Mathew, Houston, TX (US); Patrick Brant, Seabrook, TX (US); James C. Vizzini, Pasadena, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 185 days.

(21) Appl. No.: 10/683,593

(22) Filed: Oct. 10, 2003

(65) Prior Publication Data

US 2004/0127649 A1 Jul. 1, 2004

Related U.S. Application Data

(60) Provisional application No. 60/421,026, filed on Oct. 24, 2002.

(51) Int. Cl.
*C08F 4/44* (2006.01)

(52) U.S. Cl. .................. 526/116; 526/351; 526/160; 526/943

(58) Field of Classification Search ................. 526/352, 526/948, 113, 116, 160, 943, 351; 502/152
See application file for complete search history.

(56) References Cited

U.S. PATENT DOCUMENTS

| | | | | |
|---|---|---|---|---|
| 3,878,129 A | 4/1975 | Rosback | ................. | 252/455 Z |
| 3,929,669 A | 12/1975 | Rosback et al. | .......... | 252/455 Z |
| 3,998,901 A | 12/1976 | Neuzil et al. | .......... | 260/674 SA |
| 4,028,428 A | 6/1977 | Neuzil et al. | .......... | 260/674 SA |
| 4,934,580 A | 6/1990 | Sutton | ......................... | 228/157 |
| 4,987,193 A | 1/1991 | Gotoh | ......................... | 525/313 |
| 5,272,236 A | 12/1993 | Lai et al. | .................. | 526/348.5 |
| 5,296,434 A | 3/1994 | Karl et al. | .................. | 502/117 |
| 5,350,817 A | 9/1994 | Winter et al. | ................ | 526/119 |
| 5,350,819 A | 9/1994 | Shaffer | ...................... | 526/189 |
| 5,418,065 A | 5/1995 | Fujiki et al. | ................ | 428/451 |
| 5,418,308 A | 5/1995 | Harvie | ........................ | 526/336 |
| 5,422,185 A | 6/1995 | Egami et al. | ................ | 428/412 |
| 5,504,171 A | 4/1996 | Etherton et al. | ............. | 526/336 |
| 5,514,744 A | 5/1996 | Etherton et al. | ............. | 526/144 |
| 5,516,848 A | 5/1996 | Canich et al. | ............... | 525/240 |
| 5,539,056 A | 7/1996 | Yang et al. | ................... | 525/240 |
| 5,571,867 A | 11/1996 | Luvinh et al. | ................. | 525/99 |
| 5,635,573 A | 6/1997 | Harrington et al. | .......... | 526/170 |
| 5,670,580 A | 9/1997 | Tazaki et al. | ................ | 525/240 |
| 5,670,595 A | 9/1997 | Meka et al. | .................. | 526/336 |
| 5,696,045 A | 12/1997 | Winter et al. | ................ | 502/113 |
| 5,698,651 A | 12/1997 | Kawasaki et al. | ........... | 526/336 |
| 5,866,663 A | 2/1999 | Brookhart et al. | ........... | 526/170 |
| 5,986,009 A | 11/1999 | Thoen et al. | ................ | 525/240 |
| 5,993,922 A | 11/1999 | Babrowicz et al. | ......... | 428/35.7 |
| 5,998,547 A | 12/1999 | Hohner | ....................... | 525/301 |
| 6,114,457 A | 9/2000 | Markel et al. | ................ | 525/240 |
| 6,114,477 A | 9/2000 | Merrill et al. | .................. | 526/68 |
| 6,117,962 A | 9/2000 | Weng et al. | .................. | 526/351 |
| 6,121,377 A | 9/2000 | Chien | .......................... | 525/88 |
| 6,121,383 A | 9/2000 | Abdou-Sabet et al. | ...... | 525/192 |
| 6,124,400 A | 9/2000 | Chien | .......................... | 525/88 |
| 6,143,846 A | 11/2000 | Herrmann et al. | ........... | 526/170 |
| 6,147,174 A | 11/2000 | Holtcamp et al. | ........... | 526/160 |
| 6,147,180 A | 11/2000 | Markel et al. | ................ | 526/352 |
| 6,150,481 A | 11/2000 | Winter et al. | ................ | 526/118 |
| 6,177,377 B1 | 1/2001 | Chien | ......................... | 502/113 |
| 6,184,327 B1 | 2/2001 | Weng et al. | .................. | 526/351 |
| 6,207,606 B1 | 3/2001 | Lue et al. | ..................... | 502/113 |
| 6,225,432 B1 * | 5/2001 | Weng et al. | .................. | 526/351 |
| 6,248,832 B1 | 6/2001 | Peacock | ...................... | 525/191 |
| 6,258,903 B1 | 7/2001 | Mawson et al. | ............. | 526/113 |
| 6,271,323 B1 | 8/2001 | Loveday et al. | ............. | 526/161 |
| 6,297,301 B1 | 10/2001 | Erderly et al. | ............... | 524/157 |
| 6,323,284 B1 | 11/2001 | Peacock | ...................... | 525/237 |
| 6,342,574 B1 | 1/2002 | Weng et al. | .................. | 526/351 |
| 6,346,586 B1 | 2/2002 | Agapiou et al. | ............. | 526/160 |
| 6,407,189 B1 | 6/2002 | Herrmann | .................... | 526/160 |
| 6,583,227 B2 * | 6/2003 | Mehta et al. | ................. | 525/240 |
| 2001/0007896 A1 | 7/2001 | Agarwal et al. | ............. | 526/335 |
| 2001/0047064 A1 | 11/2001 | Sun | .............................. | 526/74 |
| 2002/0013440 A1 | 1/2002 | Agarwal et al. | ............. | 526/335 |

FOREIGN PATENT DOCUMENTS

| | | |
|---|---|---|
| EP | 0 284 850 A2 | 10/1988 |
| EP | 0 527 589 A1 | 2/1993 |

(Continued)

OTHER PUBLICATIONS

Palanisamy Arjunan, et al., "In-Situ LCB-PP via High Temperature Propylene Polymerization Process (including "Supercritical Polymerization")", PLT. 16CP.2001, Nov. 20, 2001.

(Continued)

*Primary Examiner*—Robert D. Harlan

(57) ABSTRACT

Branched crystalline polypropylene compositions and methods for the preparation of branched crystalline polypropylene compositions are provided. For example, described herein is a process of preparing a branched crystalline polypropylene composition that includes combining two or more different metallocene catalyst compounds with a polymerization medium that includes propylene, for a time sufficient to provide branched crystalline polypropylene that has from 0.0 wt % to 2.0 wt % ethylene and a heat of fusion of 70 J/g or more.

11 Claims, No Drawings

FOREIGN PATENT DOCUMENTS

| | | |
|---|---|---|
| EP | 0 667 359 A1 | 8/1995 |
| EP | 0 718 324 A2 | 6/1996 |
| EP | 0 864 593 A1 | 9/1998 |
| EP | 0 942 017 A2 | 9/1999 |
| EP | 0 987 279 A1 | 3/2000 |
| EP | 1 008 607 A1 | 6/2000 |
| EP | 0 806 436 B1 | 7/2000 |
| EP | 0 619 325 B1 | 8/2001 |
| EP | 0645401 | 12/2001 |
| EP | 1 195 391 A1 | 4/2002 |
| EP | 1223191 | 7/2002 |
| GB | 1 589 213 | 5/1981 |
| JP | 05-320445 | 3/1993 |
| JP | 05-146747 | 6/1993 |
| JP | 1994025357 A | 1/1994 |
| JP | 06-172448 | 6/1994 |
| WO | WO98/10016 A1 | 3/1998 |
| WO | WO98/33823 A1 | 8/1998 |
| WO | WO98/34724 A1 | 8/1998 |
| WO | WO98/34971 A1 | 8/1998 |
| WO | WO98/49229 A1 | 11/1998 |
| WO | WO99/02540 A1 | 1/1999 |
| WO | WO99/11680 A1 | 3/1999 |
| WO | WO99/19547 A1 | 4/1999 |
| WO | WO 99/29742 | 6/1999 |
| WO | WO99/29749 A1 | 6/1999 |
| WO | WO99/32226 A1 | 7/1999 |
| WO | WO99/64497 A1 | 12/1999 |
| WO | WO 00/06621 A1 | 2/2000 |
| WO | WO 00/12572 A1 | 3/2000 |
| WO | WO 00/37514 | 6/2000 |
| WO | WO 01/09200 A1 | 2/2001 |
| WO | WO 01/46273 A1 | 6/2001 |
| WO | WO 01/46274 A1 | 6/2001 |
| WO | WO 01/58970 | 8/2001 |
| WO | WO 02/28923 A1 | 4/2002 |
| WO | WO 02/50145 A1 | 6/2002 |
| WO | WO 02/070572 | 9/2002 |
| WO | WO 02/090399 A1 | 11/2002 |

OTHER PUBLICATIONS

Chen, et al., "*Cocatalysts for Metal-Catalyzed Olefin Polymerization: Activators, Activation Processes, and Structure-Activity Relationships,*" Chem. Rev. 2000, 100, pp. 1391-1434.

Dassaud, et al., "*Copolymerization of Propene-nonconjugated Dienes: Derivatization Through Hydroboration and Epoxydation*", Polymers for Advanced Technologies, vol. 4, pp. 457-464, John Wiley & Sons, Ltd., (1992).

de Souza, "*Recent Advances in Olefin Polymerization Using Binary Catalyst Systems*", Macromol. Rapid Commun. 2001, 22, No. 16, pp. 1293-1301.

Hackman, et al., "*Functional Olefin Copolymers: Uniform Architectures of Propene/7-Methyl-1,6-octadiene Copolymers by ATR-FTIR Spectroscopy Control of Monomer Composition*", Macromolecules 2000, 33, pp. 1524-1529.

Hackmann, et al., "*Zirconocene-MAO Catalyzed (co)Polymerization of Linear Non-symmetrically Substituted Dienes with Propene: A Novel Strategy to Tailored Functional Copoly($\alpha$-olefin)s and Bursh Copolymers*", Polym. Mater. Sci. 1999, 80, pp. 143-144.

Hackmann, et al., "*Zirconocene-MAO Catalyzed Homo-and Copolymerizations of Linear Asymmetrically Susbstituted Dienes with Propene: A Novel Strategy to Functional (co)poly($\alpha$-olefin)s*", Macromol. Chem. Phys., pp. 1511-1517, 1998 (Germany).

Lee, et al. "*Copolymerizations of Olefins and Dienes with Homogeneous and Heterogeneous Catalysts*", Eur. Polym. J., vol. 33, No. 4, pp. 447-451, 1997, Great Britain.

Markel, et al., "*Metallocene-Based Branch-Block Thermoplastic Elastomers*", Macromolecules®, reprinted from vol. 33, No. 23, pp. 8541-8548.

Resconi, et al., "*Selectivity in Propene Polymerization with Metallocene Catalysts*", Chem. Rev. 2000, 100, pp. 1253-1345.

Weng et al., "*Synthesis of Long-Chain Branched Propylene Polymers via Macromonomer Incorporation*", Macromolecular Rapid Communications vol. 22, No. 18, pp. 1488-1492.

\* cited by examiner

BRANCHED CRYSTALLINE POLYPROPYLENE

CROSS REFERENCE TO RELATED APPLICATION

This application claims the benefit of Provisional Application No. 60/421,026, filed Oct. 24, 2002, the disclosure of which is incorporated by reference.

BACKGROUND OF INVENTION

1. Field of Invention

The present invention relates to branched crystalline polypropylene (BCPP) compositions and methods for the preparation of branched crystalline polypropylene compositions.

2. Description of Related Art

Various processes have been proposed for making polypropylene compositions. Such different processes will typically have different variables and parameters, including different monomer compositions, solvents, additives, reaction conditions, catalyst systems, etc. The properties and characteristics of the final product have a great deal to do with the process variables and parameters that are selected, and it has been recognized that small modifications in such variables and parameters can create significant differences in not only the final product, e.g., polymer properties, but also in the effectiveness of the overall process, e.g., catalyst productivity, presence or absence of gel. Background references include U.S. Pat. Nos. 5,571,867, 6,225,432 B1, 6,323,284 B1, 6,121, 383, WO 99/29742, WO 00/37514, WO 02/070572, WO 01/58970, EP 0 645 401 A, EP 1 223 191 A, and *Synthesis of Long-Chain Branched Propylene Polymers Via Macromonomer Incorporation*, Weng et al., MACROMOL. RAPID COMMUN., Vol. 22, No. 18, 1488–1492 (2001).

An ongoing need exists for processes that provide polypropylene with good processability and high melt strength, which is desirable for applications such as thermoforming, foaming, and blow molding. Poor melt strength of polypropylenes shows up as excess sag in sheet extrusion, rapid thinning of walls in parts thermoformed in the melt phase, low draw-down ratios in extrusion coating, poor bubble formation in extrusion foam materials, and relative weakness in large-part blow molding. Thus, it would be highly desirable to produce a polypropylene having enhanced melt strength as well as commercially valuable processability.

Furthermore, a need exists for a relatively straightforward method of preparing polypropylene having desirable properties, particularly a method for making a BCPP that does not require the use of a cross-linking agent, e.g., post-polymerization treatments, or the use of comonomers that have been found to result in undesirable gel formation, such as certain types of diene comonomers. Finally, there is a need for a process demonstrating high catalyst productivity in forming the BCPPs described herein.

SUMMARY OF INVENTION

Described herein are branched crystalline polypropylenes and processes for preparing branched crystalline polypropylenes. The processes in certain aspects include: combining two or more different metallocene catalyst compounds with a polymerization medium that includes propylene, for a time sufficient to provide branched crystalline polypropylene that has from 0.0 wt % to 2.0 wt % ethylene and a heat of fusion of 70 J/g or more.

In one or more specific embodiments, a process of preparing a unimodal polymer composition that includes branched crystalline polypropylene is described, such process including combining two or more different metallocene catalyst compounds with propylene monomers in a polymerization medium having less than 30 volume percent diluent, or more preferably less than 25 volume or 20 volume percent diluent; conducting polymerization of the propylene monomers in the polymerization medium at a reaction temperature of 75° C. or less to form branched crystalline polypropylene; and recovering a branched crystalline polypropylene that has (a) from 0.0 wt % to 2.0 wt % ethylene; (b) a heat of fusion of 70 J/g or more; and (c) a unimodal molecular weight distribution.

Additionally described is a process of preparing a polymer composition that includes branched crystalline polypropylene, comprising: conducting polymerization of propylene monomers in the presence of a first metallocene catalyst compound and a second metallocene catalyst compound at a temperature of 75° C. or less to provide a composition that includes branched crystalline polypropylene containing from 0.0 wt % to 2.0 wt % ethylene, wherein: (a) the first metallocene catalyst compound is capable of producing polypropylene macromers; and (b) the second metallocene catalyst compound is capable of producing crystalline polypropylene having a weight average molecular weight of 100,000 Daltons or more.

Also described herein is a process of preparing a branched crystalline polypropylene composition, which process includes: contacting a polymerization mixture that includes propylene monomers with a first metallocene catalyst compound and a second metallocene catalyst compound; and conducting polymerization of the propylene monomers for a time sufficient to form a branched crystalline polypropylene composition having a heat of fusion of 70 J/g or more, wherein: the first metallocene compound is an alkyl bridged metallocene compound that has at least two indenyl rings or derivatives of indenyl rings, each ring being substituted at one or both of the 4 and 7 positions; and the second metallocene compound is a bridged metallocene compound that has at least two indenyl rings or derivatives of indenyl rings, each ring being substituted at the 2 and 4 positions.

Further described is a process of preparing a branched crystalline polypropylene composition, which includes contacting a polymerization mixture that includes propylene monomers with a first metallocene catalyst compound and a second metallocene catalyst compound; and conducting polymerization of the propylene monomers for a time sufficient to form a branched crystalline polypropylene composition having a heat of fusion of 70 J/g or more, wherein: the first metallocene compound is an alkyl bridged metallocene compound that has at least two indenyl rings or derivatives of indenyl rings, each ring being substituted at one or both of the 4 and 7 positions; the second metallocene compound is different from the first metallocene compound; and the molar amount of the second metallocene compound contacting the polymerization mixture is greater than the molar amount of the first metallocene compound contacting the polymerization mixture.

Also described is a process of preparing a unimodal branched crystalline polypropylene composition, including: combining a mixed metallocene catalyst system that includes at least a first metallocene compound and a second metallocene compound with a polymerization mixture that includes propylene monomers in a reactor system, and carrying out polymerization of the propylene monomers in the reactor system for a time sufficient to form a branched crystalline polypropylene having a unimodal molecular weight distribution. In such a process, the first metallocene compound is preferably one that can be represented by the formula

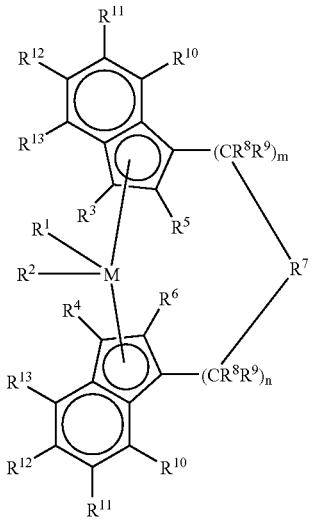

wherein: M is a metal of Group 4, 5, or 6 of the Periodic Table, for example titanium, zirconium, hafnium, vanadium, niobium, tantalum, chromium, molybdenum and tungsten, preferably, zirconium, hafnium and titanium, most preferably zirconium and hafnium;

$R^1$ and $R^2$ are identical or different, preferably identical, and are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine; or a conjugated diene which is optionally substituted with one or more hydrocarbyl, tri(hydrocarbyl) silyl groups or hydrocarbyl, tri(hydrocarbyl) silylhydrocarbyl groups, said diene having up to 30 atoms not counting hydrogen;

$R^3$ and $R^4$ may be as defined for $R^1$ and $R^2$ but are preferably hydrogen atoms;

$R^5$ and $R^6$ are identical or different, preferably identical, are one of a hydrogen atom, a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein: $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

R7 is

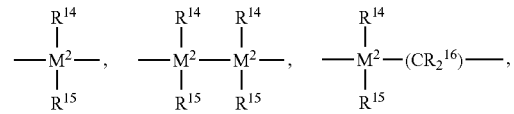

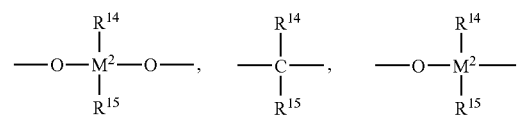

—B($R^{14}$)—, —Al($R^{14}$)—, —Ge—, —Sn—, —O—, —S—, —SO—, —$SO_2$—, —N($R^{14}$)—, —CO—, —P($R^{14}$)—, or —P(O)($R^{14}$)—;

wherein: $R^{14}$, $R^{15}$ and $R^{16}$ are identical or different and are a hydrogen atom, a halogen atom, a $C_1$–$C_{20}$ branched or linear alkyl group, a $C_1$–$C_{20}$ fluoroalkyl or silaalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{14}$ and $R^{15}$, together with the atoms binding them, form a cyclic ring;

preferably, $R^{14}$, $R^{15}$ and $R^{16}$ are identical and are a hydrogen atom, a halogen atom, a $C_1$–$C_4$ alkyl group, a $CF_3$ group, a $C_6$–$C_8$ aryl group, a $C_6$–$C_{10}$ fluoroaryl group, more preferably a pentafluorophenyl group, a $C_1$–$C_4$ alkoxy group, in particular a methoxy group, a $C_2$–$C_4$ alkenyl group, a $C_7$–$C_{10}$ arylalkyl group, a $C_9$–$C_{12}$ arylalkenyl group, or a $C_7$–$C_{14}$ alkylaryl group;

$M^2$ is carbon, silicon, germanium or tin;

$R^8$ and $R^9$ are $R^8$ and $R^9$ are identical or different, preferably identical and have the meanings stated for $R^5$ and $R^6$;

$R^{10}$, $R^{11}$, $R^{12}$ and $R^{13}$ are identical or different and have the meanings stated for $R^5$ and $R^6$;

preferably, $R^{12}$ and $R^{11}$ are hydrogen and at least one of $R^{13}$ and $R^{10}$, preferably both, are identical or different, preferably identical, and are one of a hydrogen atom, a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_9$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein: $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

m and n are identical or different and are zero, 1 or 2, preferably zero or 1, m plus n being zero, 1 or 2, preferably zero or 1.

In the process described above, the second metallocene compound is preferably one that can be represented by the formula:

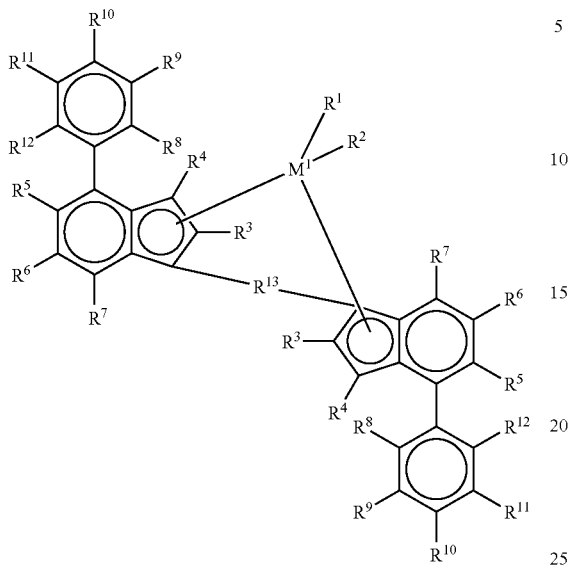

(I)

wherein:
M¹ is selected from the group consisting of titanium, zirconium, hafnium, vanadium, niobium, tantalum, chromium, molybdenum and tungsten;

$R^1$ and $R^2$ are identical or different, and are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_{40}$ alkenyl group, a $C_7$–$C_{40}$ arylalkyl group, a $C_7$–$C_{40}$ alkylaryl group, a $C_8$–$C_{40}$ arylalkenyl group, an OH group or a halogen atom; $R^1$ and $R^2$ may also be joined together to form an alkanediyl group or a conjugated $C_{4-40}$ diene ligand which is coordinated to $M^1$ in a metallocyclopentene fashion; $R^1$ and $R^2$ may also be identical or different conjugated dienes, optionally substituted with one or more hydrocarbyl, tri(hydrocarbyl)silyl groups or hydrocarbyl, tri(hydrocarbyl) silylhydrocarbyl groups, said dienes having up to 30 atoms not counting hydrogen and forming a π complex with M, examples include 1,4-diphenyl-1,3-butadiene, 1,3-pentadiene, 2-methyl-1,3-pentadiene, 2,4-hexadiene, 1-phenyl-1,3-pentadiene, 1,4-dibenzyl-1,3-butadiene, 1,4-ditolyl-1,3-butadiene, 1,4-bis(trimethylsilyl)-1,3-butadiene, and 1,4-dinaphthyl-1,3-butadiene;

Each $R^3$ is identical or different from the other $R^3$ and is each a hydrogen atom, a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —NR'$_2$, —SR', —OR', —OSiR'$_3$ or —PR'$_2$ radical, wherein R' is one of a halogen atom, a $C_1$–$C_{10}$ alkyl group, or a $C_6$–$C_{10}$ aryl group;

$R^4$ to $R^7$ are identical or different and are hydrogen, or are as defined for $R^3$ or two or more adjacent radicals $R^5$ to $R^7$ together with the atoms connecting them form one or more rings;

$R^{13}$ is

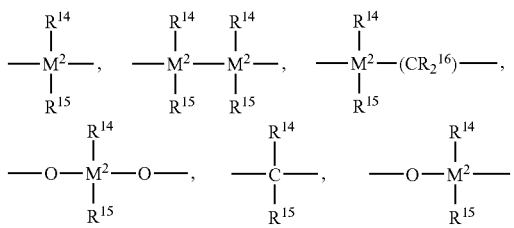

—B($R^{14}$)—, —Al($R^{14}$)—, —Ge—, —Sn—, —O—, —S—, —SO—, —SO$_2$—, —N($R^{14}$)—, —CO—, —P($R^{14}$)—, or —P(O)($R^{14}$)—;

wherein: $R^{14}$, $R^{15}$ and $R^{16}$ are identical or different and are a hydrogen atom, a halogen atom, a $C_1$–$C_{20}$ branched or linear alkyl group, a $C_1$–$C_{20}$ fluoroalkyl or silaalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{14}$ and $R^{15}$, together with the atoms binding them, form a cyclic ring;

or, $R^{13}$ is represented by the formula:

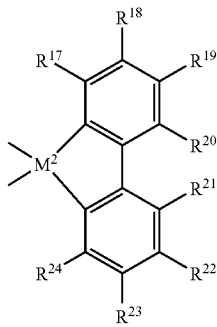

wherein: $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings;

$M^2$ is one or more carbons, silicon, germanium or tin; and $R^8$, $R^9$, $R^{10}$, $R^{11}$ and $R^{12}$ are identical or different and have the meanings stated for $R^4$ to $R^7$.

As mentioned above, various compositions are described herein. For example, described herein is a polymer composition consisting essentially of branched crystalline polypropylene homopolymer prepared in a polymerization process comprising: combining two or more different metallocene catalyst compounds; said polypropylene homopolymer having a unimodal molecular weight distribution and a heat of fusion of 70 J/g or more.

In any of the compositions described herein, the two or more metallocene catalyst compounds may include a first metallocene compound and a second metallocene compound; the first metallocene compound capable of forming vinyl, vinylene, or vinylidene terminated polypropylene macromer with a weight average molecular weight of less than 100,000 Daltons (i.e., if that first metallocene is used in a polymerization reaction alone with propylene monomers without any additional catalyst present); and the second metallocene compound capable of forming a crystalline polypropylene with a weight average molecular weight of 100,000 Daltons or more and more preferably 150,000 Daltons or more (i.e., if that second metallocene is used in a polymerization reaction alone with propylene monomers without any additional catalyst present); wherein the molar amount of the second metallocene compound is greater than the molar amount of the first metallocene compound.

Also described herein is unimodal polymer composition that includes branched crystalline polypropylene, prepared by the process that includes combining two or more different metallocene catalyst compounds with propylene monomers in a polymerization medium having less than 30 volume percent diluent; conducting polymerization of the propylene monomers in the polymerization medium at a reaction temperature of 75° C. or less; and recovering a branched crystalline polypropylene that has (a) from 0.0 wt % to 2.0 wt % ethylene; (b) a heat of fusion of 50 J/g or more; and (c) a unimodal molecular weight distribution. Preferably, the polypropylene has a Branching Index of 0.98 or less.

In another composition described herein, the two or more metallocene catalyst compounds preferably include a first metallocene compound and a second metallocene compound, wherein the first metallocene compound is capable of forming a vinyl, vinylidene or vinylene terminated polypropylene macromer with a weight average molecular weight of less than 100,000 Daltons; and the second metallocene compound is capable of forming a crystalline polypropylene with a weight average molecular weight of 100,000 Daltons or more, and more preferably 150,000 Daltons or more; wherein the molar amount of the second metallocene compound is greater than the molar amount of the first metallocene compound (the capability of each metallocene measured by separate polymerizations).

Additionally, a polymer composition is described that includes branched crystalline polypropylene that is prepared by the process including: conducting polymerization of propylene monomers in the presence of a first metallocene catalyst compound and a second metallocene catalyst compound at a temperature of 75° C. or less to provide a composition that comprises branched crystalline polypropylene containing from 0.0 wt % to 2.0 wt % ethylene, wherein: (a) the first metallocene catalyst compound is capable of producing vinyl terminated polypropylene macromers; and (b) the second metallocene catalyst compound is capable of producing crystalline polypropylene having a weight average molecular weight of 100,000 Daltons or more.

Described herein is a polymer composition that includes branched crystalline polypropylene having a heat of fusion of 50 J/g or more; a Branching Index of 0.98 or less; a unimodal molecular weight distribution; and from 0.0 wt % to 2.0 wt % ethylene.

Also disclosed is a composition that includes the combination of any of the polymer compositions described above together with one or more olefin polymers selected from the group consisting of ethylene propylene rubber, ethylene propylene diene monomer rubber, neoprene rubber, styrenic block copolymer rubbers (including SI, SIS, SB, SBS, SIBS rubbers), butyl rubber, halobutyl rubber, star branched butyl rubber, copolymers of isobutylene and para-alkylstyren, halogenated copolymers of isobutylene and para-alkylstyren, homopolypropylene, propylene copolymerized with up to 50 weight % of ethylene or a C4 to C20 alpha.-olefin, isotactic polypropylene, highly isotactic polypropylene, syndiotactic polypropylene, random copolymer of propylene and ethylene and/or butene and/or hexene, polybutene, ethylene vinyl acetate, low density polyethylene (density 0.915 to less than 0.935 g/cm$^3$) linear low density polyethylene, ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, nylons (polyamides), polycarbonates, PET resins, crosslinked polyethylene, copolymers of ethylene and vinyl alcohol (EVOH), polymers of aromatic monomers such as polystyrene, poly-1 esters, high molecular weight polyethylene having a density of 0.94 to 0.98 g/cm$^3$ low molecular weight polyethylene having a density of 0.94 to 0.98 g/cm$^3$, graft copolymers generally, polyacrylonitrile homopolymer or copolymers, thermoplastic polyamides, polyacetal, polyvinylidine fluoride and other fluorinated elastomers, polyethylene glycols and polyisobutylene.

Furthermore, described herein is a foam that includes any of the compositions described above; or a blow molded article that that includes any of the compositions described above; or a thermoformed article that includes any of the compositions described above; or a film that includes any of the compositions described above; or a fiber that includes any of the compositions described above; or a sheet that includes any of the compositions described above; or a plaque that includes any of the compositions described above; or a hose that includes any of the compositions described above; or a belt that includes any of the compositions described above; or a tire that includes any of the compositions described above; or a tape that includes any of the compositions described above; or a fabric that includes any of the compositions described above; or nonwoven that includes any of the compositions described above; or a medical garment that includes any of the compositions described above; or a wax crystal modifier that includes any of the compositions described above.

Also described herein is a dynamically vulcanized alloy (DVA) that includes an elastomer and any of the polymer compositions described above.

Also described herein is an adhesive that includes any of the polymer compositions described above together with a tackifier selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. Other tackifieres are described in greater detail below.

DETAILED DESCRIPTION

Various specific embodiments, versions and examples of the invention will now be described, including preferred embodiments and definitions that are adopted herein for purposes of understanding the claimed invention. It is understood, however, that for purposes of assessing infringement, the scope of the "invention" will refer to the appended claims, including their equivalents, and elements or limitations that are equivalent to those that are recited. All references to the "invention" below are intended to distinguish claimed compositions and methods from compositions and methods not considered to be part of this invention. It is understood, therefore, that any reference to the "invention" may refer to one or more, but not necessarily all, of the inventions defined by the claims. References to specific "embodiments" are intended to correspond to claims covering those embodiments, but not necessarily to claims that cover more than those embodiments.

DEFINITIONS AND PROPERTIES

Certain terms and properties, some of which appear in the claims, will now be defined, as used in this patent and for purposes of interpreting the scope of the claims. To the extent a term used in a claim is not defined below, it should be given the broadest definition persons in the pertinent art have given that term as reflected in printed publications and issued patents.

As used herein, the term "solvent" is defined broadly, to refer to any liquid medium in which any of the polymerization reactions described herein can take place, but not including any liquid material that is polymerized, such as monomers. The term "solvent" includes diluents, which are preferably inert, and specifically includes the solvents and diluents disclosed in Weng et al., U.S. Pat. No. 6,225,432.

The definition of the term "reactor system" used herein is any vessel, structure, enclosure, or combinations thereof in which a polymerization reaction is capable of taking place, and also includes any vessel or combination of vessels in which the various polymerization processes described herein take place, in whole or in part. A reactor system can thus be or include a single reactor vessel, or multiple reactor vessels, e.g., series or parallel reactors.

The term "metallocene" is defined broadly as a compound represented by the formula $Cp_mMR_nXq$. The symbol "Cp" refers to either a cyclopentadienyl ring, which may be substituted or unsubstituted, or a cyclopentadienyl ring derivative, such as an indenyl ring, which may also be substituted or unsubstituted. As discussed in greater detail below, a preferred metallocene compound includes two cyclopentadienyl rings, is sometimes referred to as a "bis-cyclopentadienyl" metallocene, and preferred cyclopentadienyl derivatives are bis-indenyl and bis-tetrahydroindenyl metallocene compounds. The symbol "M" refers to a Group 4, 5, or 6 transition metal, for example, titanium, zirconium, hafnium, vanadium, niobium, tantalum, chromium, molybdenum and tungsten. The symbol "R" in the general formula above refers to a hydrocarbyl group, e.g., methyl, or a hydrocarboxy group, each of which may have from one to 20 carbon atoms. The symbol "X" refers to a halogen, e.g., chlorine, bromine, or fluorine. The letter "m" can represent 1, 2, or 3; the letter "n" can represent 0, 1, 2, or 3; and the letter "q" can represent 0, 1, 2, or 3. The sum of m+n+q should be equal to the oxidation state of the transition metal. Examples of metallocene compounds are found in U.S. Pat. Nos. 4,530,914; 4,542,199; 4,769,910; 4,808,561; 4,871,705; 4,892,851; 4,933,403; 4,937,299; 5,017,714; 5,057,475; 5,120,867; 5,132,381; 5,155,080; 5,198,401; 5,278,119; 5,304,614; 5,324,800; 5,350,723; 5,391,790; 6,376,410; 6,376,412; 6,380,120; 6,376,409; 6,380,122; and 6,376,413. The portions of those patents describing the metallocene compounds and the ingredients and procedures for making and using such compounds are incorporated herein by reference. As discussed in greater detail below, preferred metallocene catalyst compounds are subsets of the general metallocene category, particularly those that provide the desired combinations of properties, as well as those that have demonstrated remarkably high productivities.

The term "mixed metallocene catalyst system," as used herein, is defined as two or more different metallocene compounds, in combination with other ingredients, such as co-catalysts, activators, and other compounds that further aid the catalyst in promoting polymerization; but the term does not include polymerizable materials, e.g., monomers or macromers, or inert solvents. One metallocene is considered to be "different" from another metallocene when the two metallocenes have different chemical structures, except that metallocene compounds that are enantiomers of each other are not considered to be different from each other. Preferably, the mixed metallocene catalyst system includes the first and second metallocenes described below, and more preferably having the specific structures indicated below and being contacted with the polymerization medium in the proportions and manner described below. The two or more metallocene compounds of the mixed metallocene catalyst system can be introduced to a reactor system in a manner to cause the formation of a branched polypropylene (BCPP) discussed herein. The reactor system may be a single reactor vessel in which the processes described herein may be conducted in a continuous manner, so that each metallocene compound may be added to that reactor simultaneously or separately, e.g., at different times and even in different locations, e.g., by being introduced via separate catalyst feed streams. Alternatively, a reactor system that includes multiple reactor vessels may be used, in which case each metallocene compound may be added separately to the separate reactors. In one or more specific embodiments, each of the at least two metallocene compounds simultaneously contact the polymerization medium at some point during polymerization, and preferably contact propylene monomers, and more preferably contact both propylene monomers and polypropylene macromers. In one or more embodiments of the processes described herein, both metallocene compounds are supported, e.g., on silica or alumina particles; while in other embodiments, the metallocene compounds are not supported.

An important feature of one or more specific embodiments of the invention relates to the formation of crystalline polymers that are "branched," at least to some degree. Various procedures have been published, and either are or will be available to identify whether a polymer is branched or not, and a polymer is regarded herein as being "branched" to the extent branching can be detected, regardless of the method or equipment used for such detection. Preferably, the crystalline polypropylene is branched to a degree that it can be measured quantitatively, and even more preferably expressed in terms of a branching index. A well known branching index for monodisperse polymers is used herein, referred to herein as "Branching Index," also known as g', which is defined as the ratio of intrinsic viscosities of the branched to linear molecules, i.e., $g'=[\eta]_{br}/[\eta]_{lin}$. The term "$\eta$" stands for intrinsic solution viscosity. The term "$[\eta]_{br}$" is the intrinsic viscosity for the branched polymer molecule, and the term "$[\eta]_{lin}$" is that for a linear polymer molecule of equal molecular weight. For polydisperse samples the Branching Index is an average branching index, $\langle g' \rangle_{avg}$, defined as:

$$\langle g' \rangle_{avg} = \frac{[\eta]_{branched}}{[\eta]_{linear}} = \frac{\sum_{i=1}^{N} C_i \times [\eta]_i}{\sum_{i=1}^{N} C_i \times [k \times M_i^\alpha]}$$

Here, the index i refers to a given polymer fraction, $M_i$ is the molecular weight of that fraction as measured by light scattering, $[\eta]_i$ is the intrinsic viscosity of that fraction measured by viscometry, $C_i$ is the concentration of that fraction, and "k" and "a" are the Mark Houwink coefficients for a linear polymer of the same chemical species. These quantities are measured by a GPC setup with online light scattering, viscometer, and concentration detectors. A polymer sample having branching will have intrinsic viscosity that deviates from that of a linear polymer. If a polymer sample is linear, the branching index, g', will be 1.0 (+/−0.01). If a polymer sample is branched, the average branching index will be less than 1. A lower branching index indicates more branching. In practice, average deviation levels can be calculated from GPC-3D method involving three different detectors on line—LALLS, Viscometry, DRI—to measure, respectively, the molecular weights, viscosity, and concentration of the polymer solution. First, the GPC-LALLS data is used to measure molecular weight averages ($M_w$, $M_z$). The respective intrinsic viscosity of the polymer solution, "η", is obtained from the viscometer data while the concentration at each data point is provided by the DRI technique. Finally the "η" is related to absolute molecular weight. Weight-average values of g' are to be calculated from the data points that fall in the range of from the characteristic $M_w$ of the polymer examined to the upper limit of 2,000,000 Daltons. For any case in which some values of $M_w$ are below 100,000 Daltons, the weight average is calculated using only those points between 100,000 Daltons and 2,000,000 Daltons. To calculate the branching index for polypropylene that includes at least some ethylene monomer units, the following equations should be used: g'=1.18 w, where "w" is the weight fraction of ethylene.

Melting and crystallization temperatures of the polymers (Tm and Tc) are measured on a DuPont DSC-912 with thin molded film samples, scanning at 10° C./min. The melting temperatures described herein are obtained from the second melt.

As used herein, the term "polypropylene" means a polymer made of at least 50% propylene units, preferably at least 70% propylene units, more preferably at least 80% propylene units, even more preferably at least 90% propylene units or 95% propylene units, and most preferably essentially 100% propylene units, which polypropylene is referred to as a "homopolymer." In one or more specific embodiments described herein, a "polypropylene" referenced herein may have 65 wt % or more propylene; or 80 wt % or more propylene; or 90 wt % or more propylene; or 97 wt % or more propylene.

A polypropylene polymer made according to the processes described herein is considered distinguishable from polymers that are sometimes described in the scientific or patent literature as "polypropylene" but which contain undesirably high levels of ethylene. It has been recognized that even relatively small amounts of ethylene monomer can have a significant or substantial effect on final polymer properties. Accordingly, as used herein, the term "polypropylene" refers to a polypropylene polymer with no more than 3.0 wt % ethylene; or no more than 2.5 wt % ethylene. Preferably, the polypropylenes described herein have no more than 2.0 wt % ethylene; or no more than 1.5 wt % ethylene; or no more than 1.0 wt % ethylene.

As used herein, the term "linear polypropylene" means a polypropylene having no detectable branching (quantitatively or qualitatively), preferably a Branching Index of 1.0 (+/−0.02).

As used herein, the term "branched polypropylene" (BCPP) means a polypropylene that is branched (detected quantitatively or qualitatively), and preferably has a Branching Index, based on measured data, of less than 1.0 (+/−0.02).

As used herein, the term "polymerization medium" includes at least the monomers that form the polypropylene polymer and optionally a solvent. The term "polymerization medium" does not include a catalyst system, e.g., catalyst compounds or activators. After polymerization has begun, the polymerization medium may also include products of polymerization, e.g. macromers and other polymers.

As used herein, the term "slurry polymerization" means a polymerization process in which particulate, solid polymer is formed in a liquid or vapor polymerization medium.

As used herein, the term "bulk process" means a polymerization process in which the polymerization medium consists entirely of or consists essentially of monomers and any products of polymerization that has taken place, e.g. macromers and polymers, but does not include solvent.

As used herein, the term "macromer" is defined as a polymeric structure that contains monomers, e.g., propylene monomer units. A macromer is a polymer with a relatively low molecular weight, in contrast with the fully formed polymer. For example, a macromer can be a polymer having a weight average molecular weight ($M_w$) of 150,000 or less, or more narrowly 100,000 or less, or 80,000 or less. Narrower preferred ranges for the macromer are from 1,000 to 100,000, or from 10,000 to 80,000. Although the macromers described herein are types of polypropylene polymers, they are not considered to be fully formed polypropylene polymers, e.g., they do not necessarily have the desired properties, structures, or molecular weights, e.g., as those of the final polymer product. The macromers described herein preferably have only a small amount of branching or no branching. Preferably, however, they are crystalline, being either isotactic or syndiotactic. In at least certain embodiments, during polymerization a macromer is incorporated into the branched crystalline polypropylene polymer that is formed according to processes described herein.

As used herein, the terms "unimodal" and "unimodal molecular weight distribution" are defined as any molecular weight distribution of a polymer composition that is neither bimodal nor multimodal, and broadly encompasses any polymer composition of which a GPC-3D curve can be taken, and the derivative of such GPC-3D curve demonstrate no inflection point. Preferably, a GPC-3D curve is prepared using the viscometer test procedures, conditions and equipment set-forth in the article, "Effect of Short Chain-Branching on the Coil Dimensions of Polyolefins in Dilute Solutions," by T. Sun, P. Brant, R. Chance and W. Graessley, Macromolecules 2001, Vol. 34 (No. 19), pages 6812–6820, which is incorporated herein by reference.

The amount of vinyl chain ends is determined by $^1$H NMR as set forth in the literature, specifically in Weng et al., Macromol. Rapid Commun. 2000, 21, 1103–07.

The terms "molecular weight" ($M_n$ and $M_w$) and "polydispersity" (Mw/Mn) are intended to broadly encompass molecular weights that are obtained, measured and/or calculated using any published procedure, except to the extent a particular procedure is specified herein. Preferably, the molecular weights are measured in accordance with the procedure described in the article by T. Sun et al., cited above.

The "melt flow rate" (MFR) is measured in accordance with ASTM D-1238 at 230° C. and 2.16 kg load.

A property that can be used to characterize the branched crystalline polypropylenes described herein is its heat of fusion. As used herein, the "heat of fusion" is measured using Differential Scanning Calorimetry (DSC), using the ASTM E-794-95 procedure. About 4 mg to about 10 mg of a sheet of the polymer pressed at approximately 200° C. to 230° C. is removed with a punch die and is annealed at room temperature for 48 hours. At the end of this period, the sample is placed in a Differential Scanning Calorimeter (Perkin Elmer 7 Series Thermal Analysis System) and cooled to about −50° C. to −70° C. The sample is heated at about 10° C./min to attain a final temperature of about 180° C. to about 200° C. The thermal output is recorded as the area under the melting peak of the sample which is typically at a maximum peak at about 30° C. to about 175° C. and occurs between the temperatures of about 0° C. and about 200° C. The thermal output is measured in Joules as a measure of the heat of fusion. The melting point is recorded as the temperature of the greatest heat absorption within the range of melting temperature of the sample.

The term "isotactic" as used herein is defined as referring to a polymer sequence in which more than 50% of adjacent monomers having groups of atoms that are not part of the backbone structure are located either all above or all below the atoms in the backbone chain, when the latter are all in one plane.

The term "syndiotactic" as used herein is defined as referring to a polymer sequence in which more than 50% of adjacent monomers which have groups of atoms that are not part of the backbone structure are located in some symmetrical fashion above and below the atoms in the backbone chain, when the latter are all in one plane.

The branched polypropylene polymers described herein are characterized as being "crystalline." The crystallinity of a polymer can be expressed in terms of percent crystallinity, usually with respect to some reference or benchmark crystallinity. The crystallinities of the polypropylenes described herein are expressed as a percentage of the crystallinity of isotactic polypropylene homopolymer, which is defined herein to be 190 J/g. Thus, in one or more specific embodiments, crystalline polypropylene compositions described herein have a crystallinity of from 30% of the crystallinity of an isotactic polypropylene homopolymer, preferably from 40% to 50%. Preferably, heat of fusion is used to actually measure crystallinity for purposes of comparing to isotactic polypropylene homopolymer. Thus, for example, based on a heat of fusion for a highly crystalline polypropylene homopolymer of 190 J/g, a branched crystalline polypropylene having a heat of fusion of 95 J/g will have a crystallinity of 50%.

The term "melting point" for a material as used herein is defined as the highest peak among principal and secondary melting peaks as determined by Differential Scanning Calorimetry (DSC), discussed above.

As used herein, the term "productivity" is defined as the weight of polymer produced per weight of the catalyst used in the polymerization process per 1 hour of polymerization time (e.g., grams polymer/gram catalyst/hr). Note that the term "catalyst" may actually refer to a mixed catalyst system, which includes at least two different catalyst compounds, in which case the productivity value refers to the productivity of the combined catalysts.

SPECIFIC EMBODIMENTS OF PROCESSES

Certain specific embodiments of the invention will now be discussed. As described in greater detail below, at least certain embodiments of the process result in crystalline branched polypropylene, and yet avoid the necessity for using diene comonomers, particularly those diene comonomers that result in gel formation, or for using hydrogen during polymerization, and yet provide a branched polypropylene that is crystalline and has high melt strength and other desirable properties. An advantage to certain embodiments is unexpectedly high productivities. Furthermore, although two different catalysts are used, the compositions in certain preferred embodiments unexpectedly have a unimodal composition.

In one or more specific embodiments, a process of preparing a polymer composition that includes branched crystalline polypropylene is described, which process includes: combining two or more different metallocene catalyst compounds with a polymerization medium that includes propylene, for a time sufficient to provide branched crystalline polypropylene that has from 0.0 wt % to 2.0 wt % ethylene and a heat of fusion of 70 J/g or more.

In one or more specific embodiments, a process of preparing a unimodal polymer composition that includes branched crystalline polypropylene is described, such process including combining two or more different metallocene catalyst compounds with propylene monomers in a polymerization medium having less than 30 volume percent diluent, or more preferably less than 25 volume or 20 volume percent diluent; conducting polymerization of the propylene monomers in the polymerization medium at a reaction temperature of 75° C. or less to form branched crystalline polypropylene; and recovering a branched crystalline polypropylene that has (a) from 0.0 wt % to 2.0 wt % ethylene; (b) a heat of fusion of 70 J/g or more; and (c) a unimodal molecular weight distribution.

Additionally described is a process of preparing a polymer composition that includes branched crystalline polypropylene, comprising: conducting polymerization of propylene monomers in the presence of a first metallocene catalyst compound and a second metallocene catalyst compound at a temperature of 75° C. or less to provide a composition that includes branched crystalline polypropylene containing from 0.0 wt % to 2.0 wt % ethylene, wherein: (a) the first metallocene catalyst compound is capable of producing polypropylene macromers; and (b) the second metallocene catalyst compound is capable of producing crystalline polypropylene having a weight average molecular weight of 100,000 Daltons or more.

Also described herein is a process of preparing a branched crystalline polypropylene composition, which process includes: contacting a polymerization mixture that includes propylene monomers with a first metallocene catalyst compound and a second metallocene catalyst compound; and conducting polymerization of the propylene monomers for a time sufficient to form a branched crystalline polypropylene composition having a heat of fusion of 70 J/g or more, wherein: the first metallocene compound is an alkyl bridged metallocene compound that has at least two indenyl rings or derivatives of indenyl rings, each ring being substituted at one or both of the 4 and 7 positions; and the second metallocene compound is a bridged metallocene compound that has at least two indenyl rings or derivatives of indenyl rings, each ring being substituted at the 2 and 4 positions.

Further described is a process of preparing a branched crystalline polypropylene composition, which includes contacting a polymerization mixture that includes propylene monomers with a first metallocene catalyst compound and a second metallocene catalyst compound; and conducting polymerization of the propylene monomers for a time sufficient to form a branched crystalline polypropylene composition having a heat of fusion of 70 J/g or more, wherein: the first metallocene compound is an alkyl bridged metallocene compound that has at least two indenyl rings or derivatives of indenyl rings, each ring being substituted at one or both of the 4 and 7 positions; the second metallocene compound is different from the first metallocene compound; and the molar amount of the second metallocene compound contacting the polymerization mixture is greater than the molar amount of the first metallocene compound contacting the polymerization mixture.

Also described is a process of preparing a unimodal branched crystalline polypropylene composition, including: combining a mixed metallocene catalyst system that includes at least a first metallocene compound and a second metallocene compound with a polymerization mixture that includes propylene monomers in a reactor system, and carrying out polymerization of the propylene monomers in the reactor system for a time sufficient to form a branched crystalline polypropylene having a unimodal molecular weight distribution. In such a process, the first metallocene compound is preferably represented by the formula:

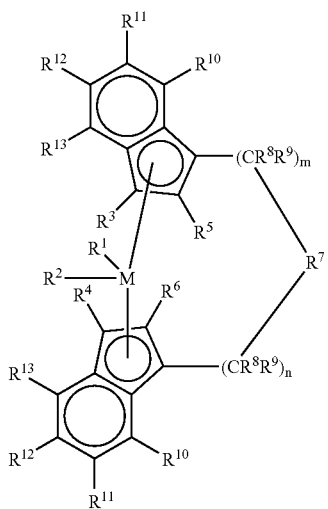

wherein: M is a metal of Group 4, 5, or 6 of the Periodic Table, for example titanium, zirconium, hafnium, vanadium, niobium, tantalum, chromium, molybdenum and tungsten, preferably, zirconium, hafnium and titanium, most preferably zirconium and hafnium;

$R^1$ and $R^2$ are identical or different, preferably identical, and are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_9$–$C_{40}$ arylalkenyl group, preferably a $C_8$–$C_{12}$ arylalkenyl group, or a halogen atom, preferably chlorine; or a conjugated diene which is optionally substituted with one or more hydrocarbyl, tri(hydrocarbyl) silyl groups or hydrocarbyl, tri(hydrocarbyl) silylhydrocarbyl groups, said diene having up to 30 atoms not counting hydrogen;

$R^3$ and $R^4$ may be as defined for $R^1$ and $R^2$ but are preferably hydrogen atoms;

$R^5$ and $R^6$ are identical or different, preferably identical, are one of a hydrogen atom, a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein: $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

R7 is

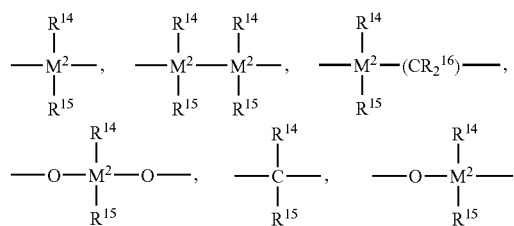

—$B(R^{14})$—, —$Al(R^{14})$—, —Ge—, —Sn—, —O—, —S—, —SO—, —$SO_2$—, —$N(R^{14})$—, —CO—, —$P(R^{14})$—, or —$P(O)(R^{14})$—;

wherein: $R^{14}$, $R^{15}$ and $R^{16}$ are identical or different and are a hydrogen atom, a halogen atom, a $C_1$–$C_{20}$ branched or linear alkyl group, a $C_1$–$C_{20}$ fluoroalkyl or silaalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{14}$ and $R^{15}$, together with the atoms binding them, form a cyclic ring;

preferably, $R^{14}$, $R^{15}$ and $R^{16}$ are identical and are a hydrogen atom, a halogen atom, a $C_1$–$C_4$ alkyl group, a $CF_3$ group, a $C_6$–$C_8$ aryl group, a $C_6$–$C_{10}$ fluoroaryl group, more preferably a pentafluorophenyl group, a $C_1$–$C_4$ alkoxy group, in particular a methoxy group, a $C_2$–$C_4$ alkenyl group, a $C_7$–$C_{10}$ arylalkyl group, a $C_8$–$C_{12}$ arylalkenyl group, or a $C_7$–$C_{14}$ alkylaryl group;

$M^2$ is carbon, silicon, germanium or tin;

$R^8$ and $R^9$ are $R^8$ and $R^9$ are identical or different, preferably identical and have the meanings stated for $R^5$ and $R^6$;

$R^{10}$, $R^{11}$, $R^{12}$ and $R^{13}$ are identical or different and have the meanings stated for $R^5$ and $R^6$;

preferably, $R^{12}$ and $R^{11}$ are hydrogen and at least one of $R^{13}$ and $R^{10}$, preferably both, are identical or different, preferably identical, and are one of a hydrogen atom, a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_9$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein: $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

m and n are identical or different and are zero, 1 or 2, preferably zero or 1, m plus n being zero, 1 or 2, preferably zero or 1; and In the process described above, the second metallocene compound is preferably represented by the formula:

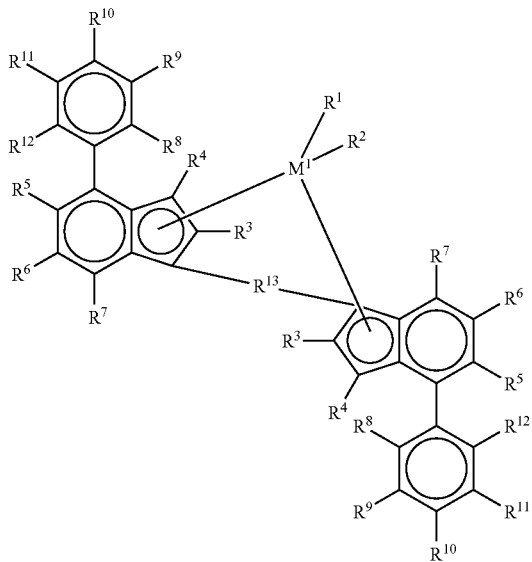

(I)

wherein:

$M^1$ is selected from the group consisting of titanium, zirconium, hafnium, vanadium, niobium, tantalum, chromium, molybdenum and tungsten;

$R^1$ and $R^2$ are identical or different, and are one of a hydrogen atom, a $C_1$–$C_{10}$ alkyl-group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_{40}$ alkenyl group, a $C_7$–$C_{40}$ arylalkyl group, a $C_7$–$C_{40}$ alkylaryl group, a $C_8$–$C_{40}$ arylalkenyl group, an OH group or a halogen atom; $R^1$ and $R^2$ may also be joined together to form an alkanediyl group or a conjugated $C_{4-40}$ diene ligand which is coordinated to $M^1$ in a metallocyclopentene fashion; $R^1$ and $R^2$ may also be identical or different conjugated dienes, optionally substituted with one or more hydrocarbyl, tri(hydrocarbyl)silyl groups or hydrocarbyl, tri(hydrocarbyl) silylhydrocarbyl groups, said dienes having up to 30 atoms not counting hydrogen and forming a π complex with M, examples include 1,4-diphenyl-1,3-butadiene, 1,3-pentadiene, 2-methyl-1,3-pentadiene, 2,4-hexadiene, 1-phenyl-1,3-pentadiene, 1,4-dibenzyl-1,3-butadiene, 1,4-ditolyl-1,3-butadiene, 1,4-bis(trimethylsilyl)-1,3-butadiene, and 1,4-dinaphthyl-1,3-butadiene;

Each $R^3$ is identical or different from the other $R^3$ and is each a hydrogen atom, a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —NR'$_2$, —SR', —OR', —OSiR'$_3$ or —PR'$_2$ radical, wherein R' is one of a halogen atom, a $C_1$–$C_{10}$ alkyl group, or a $C_6$–$C_{10}$ aryl group;

$R^4$ to $R^7$ are identical or different and are hydrogen, or are as defined for $R^3$ or two or more adjacent radicals $R^5$ to $R^7$ together with the atoms connecting them form one or more rings;

$R^{13}$ is

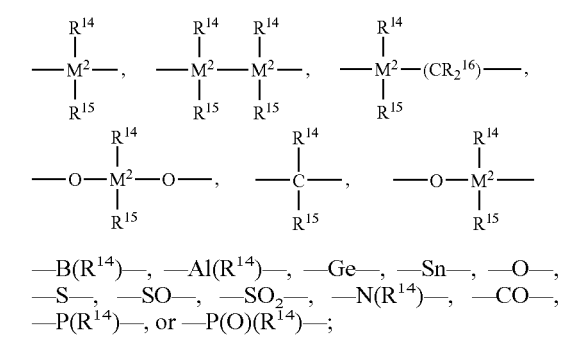

—B($R^{14}$)—, —Al($R^{14}$)—, —Ge—, —Sn—, —O—, —S—, —SO—, —SO$_2$—, —N($R^{14}$)—, —CO—, —P($R^{14}$)—, or —P(O)($R^{14}$)—;

wherein: $R^{14}$, $R^{15}$ and $R^{16}$ are identical or different and are a hydrogen atom, a halogen atom, a $C_1$–$C_{20}$ branched or linear alkyl group, a $C_1$–$C_{20}$ fluoroalkyl or silaalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{14}$ and $R^{15}$, together with the atoms binding them, form a cyclic ring;

or, $R^{13}$ is represented by the formula:

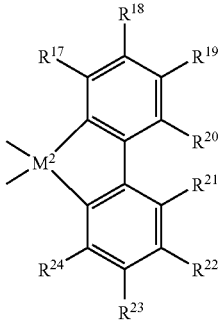

wherein: $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings;

$M^2$ is one or more carbons, silicon, germanium or tin;

$R^8$, $R^9$, $R^{10}$, $R^{11}$ and $R^{12}$ are identical or different and have the meanings stated for $R^4$ to $R^7$.

In any of the processes described above, the branched crystalline polypropylene preferably has a propylene content of 97 wt % or more.

In any of the processes described above, the branched crystalline polypropylene preferably has from 0.0 wt % to 0.01 wt %, preferably 0.01 wt %, alpha omega dienes.

In any of the processes described above, the two or more different metallocene catalyst compounds are preferably combined with propylene at a temperature of 75° C. or less to form the branched crystalline polypropylene; and more preferably combined at a temperature of 70° C. or less to form the branched crystalline polypropylene.

In any of the processes described above, the branched crystalline polypropylene is preferably isotactic or syndiotactic, more preferably isotactic.

In any of the processes described above, the two or more different metallocene catalyst compounds are preferably combined with propylene in the absence of hydrogen or in the presence of hydrogen in an amount of up to 1.0 mole % hydrogen in the reactor.

In any of the processes described above, each of the two or more different metallocene compounds is preferably used in the process as the product of combining the metallocenes, activators and support material.

In any of the processes described above, the productivity of the catalyst compounds is preferably 10,000 or more grams polymer per gram catalyst/hr; or 15,000 or more grams polymer per gram catalyst/hr; or 20,000 or more grams polymer per gram catalyst/hr.

In any of the processes described above, the heat of fusion of the branched crystalline polypropylene is preferably 80 J/g or more, but in other embodiments can be lower, e.g., 50 J/g or more, or 60 J/g or more, or 70 J/g or more. In preferred embodiments, the heat of fusion of the branched crystalline polypropylene is 90 J/g or more; or 100 J/g or more; or 110 J/g or more.

In any of the processes described above, the branched crystalline polypropylene can have a Branching Index of 0.97 or less; or a Branching Index of 0.95 or less; or a Branching Index of 0.90 or less; or a Branching Index of 0.80 or less.

In any of the processes described above, the branched crystalline polypropylene is preferably formed in a polymerization medium comprising 30% or more propylene monomers by volume prior to initiation of polymerization.

In any of the processes described above, the two or more metallocene catalyst compounds preferably include a first metallocene compound and a second metallocene compound, wherein: the first metallocene compound is capable of forming a polypropylene macromer with a weight average molecular weight of less than 100,000 Daltons; the second metallocene compound is capable of forming a crystalline polypropylene with a weight average molecular weight of 100,000 Daltons or more; and the molar amount of the second metallocene compound is greater than the molar amount of the first metallocene compound.

In any of the processes described above, the second metallocene compound is preferably combined in a molar amount of at least three times as much as the molar amount of the first metallocene. Alternatively, the second metallocene compound is combined in a molar amount of at least ten times as much as the molar amount of the first metallocene compound.

In any of the processes described above, one of the two metallocene catalyst compounds preferably includes an ethylene bridged, bis(indenyl) compound substituted at both the 4 and 7 positions with the same alkyl group.

In any of the processes described above, one of the metallocene catalyst compounds preferably includes a substituted or unsubstituted ethylene-bridged bis-indenyl metallocene, and another metallocene includes a substituted or unsubstituted silyl bridged bis-indenyl me allocene.

In any of the processes described above, one of the metallocene compounds is preferably represented by the formula

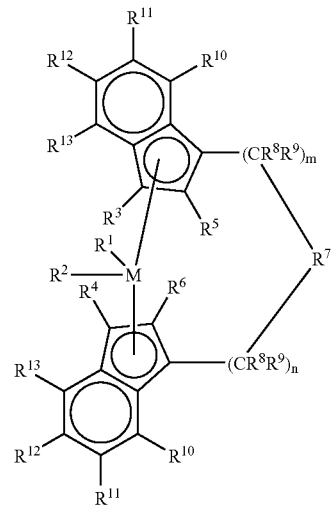

wherein: M is a metal of Group 4, 5, or 6 of the Periodic Table, for example titanium, zirconium, hafnium, vanadium, niobium, tantalum, chromium, molybdenum and tungsten, preferably, zirconium, hafnium and titanium, most preferably zirconium and hafnium;

$R^1$ and $R^2$ are identical or different, preferably identical, and are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine; or a conjugated diene which is optionally substituted with one or more hydrocarbyl, tri(hydrocarbyl) silyl groups or hydrocarbyl, tri(hydrocarbyl) silylhydrocarbyl groups, said diene having up to 30 atoms not counting hydrogen;

$R^3$ and $R^4$ may be as defined for $R^1$ and $R^2$ but are preferably hydrogen atoms; $R^5$ and $R^6$ are identical or different, preferably identical, are one of a hydrogen atom, a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein: $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

R7 is

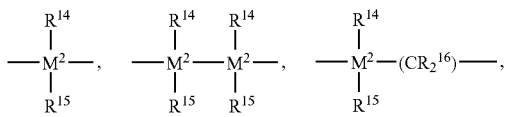

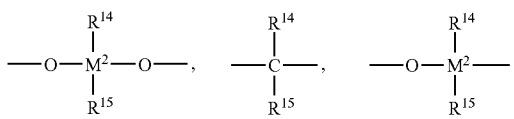

—$B(R^{14})$—, —$Al(R^{14})$—, —Ge—, —Sn—, —O—, —S—, —SO—, —$SO_2$—, —$N(R^{14})$—, —CO—, —$P(R^{14})$—, or —$P(O)(R^{14})$—;

wherein: $R^{14}$, $R^{15}$ and $R^{16}$ are identical or different and are a hydrogen atom, a halogen atom, a $C_1$–$C_{20}$ branched or linear alkyl group, a $C_1$–$C_{20}$ fluoroalkyl or silaalkyl group, a $C_6$–$C_{30}$ aryl group, a $C_6$–$C_{30}$ fluoroaryl group, a —$C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{14}$ and $R^{15}$, together with the atoms binding them, form a cyclic ring;

preferably, $R^{14}$, $R^{15}$ and $R^{16}$ are identical and are a hydrogen atom, a halogen atom, a $C_1$–$C_4$ alkyl group, a $CF_3$ group, a $C_6$–$C_8$ aryl group, a $C_6$–$C_{10}$ fluoroaryl group, more preferably a pentafluorophenyl group, a $C_1$–$C_4$ alkoxy group, in particular a methoxy group, a $C_2$–$C_4$ alkenyl group, a $C_7$–$C_{10}$ arylalkyl group, a $C_8$–$C_{12}$ arylalkenyl group, or a $C_7$–$C_{14}$ alkylaryl group;

$M^2$ is carbon, silicon, germanium or tin;

$R^8$ and $R^9$ are $R^8$ and $R^9$ are identical or different, preferably identical and have the meanings stated for $R^5$ and $R^6$;

$R^{10}$, $R^{11}$, $R^{12}$ and $R^{13}$ are identical or different and have the meanings stated for $R^5$ and $R^6$;

preferably, $R^{12}$ and $R^{11}$ are hydrogen and at least one of $R^{13}$ and $R^{10}$, preferably both, are identical or different, preferably identical, and are one of a hydrogen atom, a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_9$ aryl group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein: $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

m and n are identical or different and are zero, 1 or 2, preferably zero or 1, m plus n being zero, 1 or 2, preferably zero or 1;

and the other metallocene compound is preferably represented by the formula:

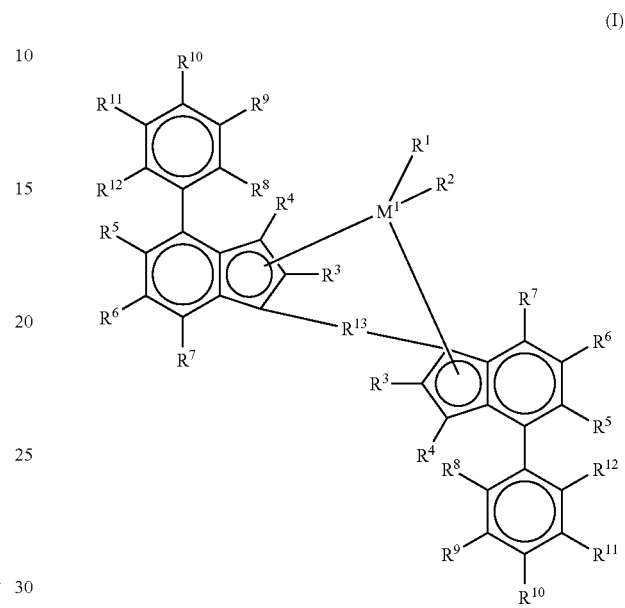

(I)

wherein: $M^1$ is selected from the group consisting of titanium, zirconium, hafnium, vanadium, niobium, tantalum, chromium, molybdenum and tungsten;

$R^1$ and $R^2$ are identical or different, and are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_{40}$ alkenyl group, a $C_7$–$C_{40}$ arylalkyl group, a $C_7$–$C_{40}$ alkylaryl group, a $C_8$–$C_{40}$ arylalkenyl group, an OH group or a halogen atom; $R^1$ and $R^2$ may also be joined together to form an alkanediyl group or a conjugated $C_{4-40}$ diene ligand which is coordinated to $M^1$ in a metallocyclopentene fashion; $R^1$ and $R^2$ may also be identical or different conjugated dienes, optionally substituted with one or more hydrocarbyl, tri(hydrocarbyl)silyl groups or hydrocarbyl, tri(hydrocarbyl) silylhydrocarbyl groups, said dienes having up to 30 atoms not counting hydrogen and forming a π complex with M, examples include 1,4-diphenyl-1,3-butadiene, 1,3-pentadiene, 2-methyl-1,3-pentadiene, 2,4-hexadiene, 1-phenyl-1,3-pentadiene, 1,4-dibenzyl-1,3-butadiene, 1,4-ditolyl-1,3-butadiene, 1,4-bis(trimethylsilyl)-1,3-butadiene, and 1,4-dinaphthyl-1,3-butadiene;

Each $R^3$ is identical or different from the other $R^3$ and is each a hydrogen atom, a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_9$–$C_{40}$ arylalkenyl group, a —$NR'_2$, —$SR'$, —$OR'$, —$OSiR'_3$ or —$PR'_2$ radical, wherein R' is one of a halogen atom, a $C_1$–$C_{10}$ alkyl group, or a $C_6$–$C_{10}$ aryl group;

$R^4$ to $R^7$ are identical or different and are hydrogen, or are as defined for $R^3$ or two or more adjacent radicals $R^5$ to $R^7$ together with the atoms connecting them form one or more rings;

$R^{13}$ is

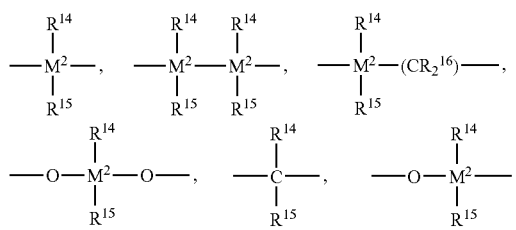

—B($R^{14}$)—, —Al($R^{14}$)—, —Ge—, —Sn—, —O—, —S—, —SO—, —SO$_2$—, —N($R^{14}$)—, —CO—, —P($R^{14}$)—, or —P(O)($R^{14}$)—;

wherein: $R^{14}$, $R^{15}$ and $R^{16}$ are identical or different and are a hydrogen atom, a halogen atom, a. $C_1$–$C_{20}$ branched or linear alkyl group, a $C_1$–$C_{20}$ fluoroalkyl or silaalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{14}$ and $R^{15}$, together with the atoms binding them, form a cyclic ring;

or, $R^{13}$ is represented by the formula:

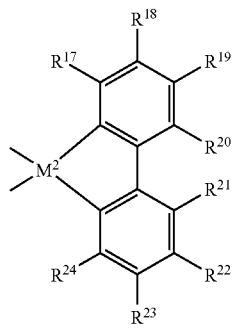

wherein: $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings;

$M^2$ is one or more carbons, silicon, germanium or tin;

$R^8$, $R^9$, $R^{10}$, $R^{11}$ and $R^{12}$ are identical or different and have the meanings stated for $R^4$ to $R^7$.

In any of the processes described above, one of the metallocene compounds preferably includes an ethylene-bridged bis-indenyl hafnocene or an ethylene-bridged bis-tetrahydroindenyl hafnocene.

In any of the processes described above, one of the metallocene compounds is preferably rac-1,2-ethylenebis(4,7-dimethyl-indenyl)hafnium dichloride or rac-1,2-ethylenebis(4,7-dimethyl-indenyl)hafnium dialkyl.

In one or more specific embodiments, the polymerization medium preferably includes 70% or more propylene monomers by volume prior to the beginning of polymerization.

In any of the processes described above, the polymerization medium preferably consists essentially of propylene monomers. The polymerization medium alternatively consists essentially of monomers and a substantially inert solvent or diluent.

Preferably, in any of the processes described above, the branched polypropylene is a homopolymer.

In any of the processes described above, the metallocene catalyst compounds can be supported, or unsupported.

In any of the processes described above, the polymerization can in certain embodiments be carried out partially in a first reactor and partially in a second reactor connected in series downstream of the first reactor; one metallocene compound being introduced to the first reactor and another metallocene compound being introduced to the second reactor.

In one or more specific embodiments, branched crystalline polypropylene composition is prepared by combining a first metallocene compound comprising an ethylene-bridged bis-indenyl hafnocene (which may be substituted) or an ethylene-bridged bis-indenyl zirconocene (which may be substituted) and a second metallocene compound comprising a silyl-bridged bis-indenyl zirconocene (which may be substituted) or silyl-bridged bis-indenyl hafnocene (which may be substituted) with a polymerization medium comprising 30% or more propylene monomers by volume; and carrying out polymerization of the monomers at a temperature of 75° C. or less for a time sufficient to form branched crystalline polypropylene.

SPECIFIC EMBODIMENTS OF COMPOSITIONS

A polymer composition is described herein that either comprises or consists essentially of (i.e., excluding any blends that would include polymers added to the branched crystalline polypropylene identified below) a branched crystalline (isotactic or syndiotactic) polypropylene homopolymer prepared in a polymerization process comprising: combining two or more different metallocene catalyst compounds; said polypropylene having a unimodal molecular weight distribution and a heat of fusion of 70 J/g or more, and preferably having a Branching Index of 0.98 or less.

That composition may also include a branched crystalline polypropylene with a heat of fusion of 75 J/g or more; or a heat of fusion of 80 J/g or more; or a heat of fusion of 85 J/g or more; or a heat of fusion of 90 J/g or more; or a heat of fusion of 95 J/g or more; or a heat of fusion of 100 J/g or more.

The Branching Index of the branched crystalline polypropylene of that composition may also be 0.97 or less; or 0.95 or less; or 0.93 or less; or 0.90 or less; or 0.80 or less.

In any of the compositions described herein, the two or more metallocene catalyst compounds may include a first metallocene compound and a second metallocene compound; the first metallocene compound capable of forming vinyl, vinylene, or vinylidene terminated polypropylene macromer with a weight average molecular weight of less than 100,000 Daltons (i.e., if that first metallocene is used in a polymerization reaction alone with propylene monomers without any additional catalyst present); and the second metallocene compound capable of forming a crystalline polypropylene with a weight average molecular weight of 100,000 Daltons or more and more preferably 150,000 Daltons or more (i.e., if that second metallocene is used in a polymerization reaction alone with propylene monomers without any additional catalyst present); wherein the molar amount of the second metallocene compound is greater than the molar amount of the first metallocene compound.

In any of the compositions described herein, one of the metallocene compounds can includes an ethylene-bridged bis-indenyl hafnocene or an ethylene-bridged bis-tetrahydroindenyle hafnocene.

In any of the compositions described herein, one of the metallocene compounds can be rac-1,2-ethylenebis(4,7-dimethyl-indenyl)hafnium dichloride or rac-1,2-ethylenebis(4,7-dimethyl-indenyl)hafnium dimethyl.

Also described herein is unimodal polymer composition that includes branched crystalline polypropylene, prepared by the process that includes combining two or more different metallocene catalyst compounds with propylene monomers in a polymerization medium having less than 30 volume percent diluent; conducting polymerization of the propylene monomers in the polymerization medium at a reaction temperature of 75° C. or less; and recovering a branched crystalline polypropylene that has (a) from 0.0 wt % to 2.0 wt % ethylene; (b) a heat of fusion of 50 J/g or more; and (c) a unimodal molecular weight distribution. Preferably, the polypropylene has a Branching Index of 0.98 or less.

In at least one embodiment of the process used to form that composition, the polymerization medium consists essentially of propylene monomers. In at least one embodiment, the composition contains 0% alpha-omega-diene derived units.

Preferably, the heat of fusion of the branched crystalline polypropylene of that composition is 70 J/g or more; or 80 J/g or more; or 90 J/g or more; or 100 J/g or more.

In one or more embodiments of the composition, the Branching Index of the branched crystalline polypropylene is 0.97 or less; or 0.95 or less; or 0.90 or less; or 0.80 or less.

In another composition described herein, the two or more metallocene catalyst compounds preferably include a first metallocene compound and a second metallocene compound, wherein the first metallocene compound is capable of forming a vinyl, vinylidene or vinylene terminated polypropylene macromer with a weight average molecular weight of less than 100,000 Daltons; and the second metallocene compound is capable of forming a crystalline polypropylene with a weight average molecular weight of 100,000 Daltons or more, and more preferably 150,000 Daltons or more; wherein the molar amount of the second metallocene compound is greater than the molar amount of the first metallocene compound (the capability of each metallocene measured by separate polymerizations).

In that composition, one of the metallocene compounds preferably includes an ethylene-bridged bis-indenyl hafnocene or an ethylene-bridged bis-tetrahydroindenyle hafnocene.

Also, one of the metallocene compounds can be rac-1,2-ethylenebis(4,7-dimethyl-indenyl)hafnium dichloride or rac-1,2-ethylenebis(4,7-dimethyl-indenyl)hafnium dialkyl.

Additionally, a polymer composition is described that includes branched crystalline polypropylene that is prepared by the process including: conducting polymerization of propylene monomers in the presence of a first metallocene catalyst compound and a second metallocene catalyst compound at a temperature of 75° C. or less to provide a composition that comprises branched crystalline polypropylene containing from 0.0 wt % to 2.0 wt % ethylene, wherein: (a) the first metallocene catalyst compound is capable of producing vinyl terminated polypropylene macromers; and (b) the second metallocene catalyst compound is capable of producing crystalline polypropylene having a weight average molecular weight of 100,000 Daltons or more.

In that composition, the polymerization medium used in the process may, in certain embodiments, consist essentially of propylene monomers.

In that composition, the heat of fusion of the branched crystalline polypropylene may in certain embodiments be 70 J/g or more; or 80 J/g or more; or 90 J/g or more; or 100 J/g or more.

In at least certain embodiments of that composition, the Branching Index of the branched crystalline polypropylene is 0.98 or less; or 0.95 or less; or 0.90 or less; or 0.80 or less.

Preferably, that composition is made using a process described herein wherein the metallocene compound includes an ethylene-bridged bis-indenyl hafnocene or an ethylene-bridged bis-tetrahydroindenyle hafnocene.

Alternatively, or in addition, one of the metallocene compounds can be rac-1,2-ethylenebis(4,7-dimethyl-indenyl)hafnium dichloride or rac-1,2-ethylenebis(4,7-dimethyl-indenyl)hafnium dialkyl.

In at least one embodiment, the branched crystalline polypropylene composition is prepared by a process that includes: contacting a polymerization mixture that includes propylene monomers with a first metallocene catalyst compound and a second metallocene catalyst compound; and conducting polymerization of the propylene monomers for a time sufficient to form a branched crystalline polypropylene composition having a heat of fusion of 50 J/g or more; or 60 J/g or more; or 70 J/g or more; and preferably having a Branching Index of 0.98 or less, wherein: the first metallocene compound is an alkyl bridged metallocene compound that has at least two indenyl rings or derivatives of indenyl rings, each ring being substituted at the 4 and 7 positions; the second metallocene compound is a bridged metallocene compound that has at least two indenyl rings or derivatives of indenyl rings, each ring being substituted at both or either of the 2 and 4 positions.

In at least certain embodiments, the polymerization medium consists essentially of propylene monomers.

In at least some of those compositions described above, the heat of fusion of the branched crystalline polypropylene is 70 J/g or more; or 80 J/g or more; or 90 J/g or more.

In at least some of the compositions described above, the Branching Index of the branched crystalline polypropylene is 0.98 or less; or 0.95 or less; or 0.90 or less; or 0.80 or less.

In at least certain compositions, one of the metallocene compounds includes an ethylene-bridged bis-indenyl hafnocene or an ethylene-bridged bis-tetrahydroindenyle hafnocene. In others, one of the metallocene compounds is rac-1,2-ethylenebis(4,7-dimethyl-indenyl)hafnium dichloride or rac-1,2-ethylenebis(4,7-dimethyl-indenyl)hafnium dialkyl.

Described herein is a polymer composition that includes branched crystalline polypropylene having a heat of fusion of 50 J/g or more; a Branching Index of 0.98 or less; a unimodal molecular weight distribution; and from 0.0 wt % to 2.0 wt % ethylene.

Also, polymer composition is described herein that includes branched crystalline polypropylene having a heat of fusion of 70 J/g or more; a Branching Index of 0.95 or less; a unimodal molecular weight distribution; and from 0.0 wt % to 2.0 wt % ethylene.

Furthermore, a polymer composition is described herein that includes branched crystalline polypropylene having a heat of fusion of 80 J/g or more; a Branching Index of 0.95 or less wherein said branching is derived solely from polypropylene macromers; and a unimodal molecular weight distribution.

Also described is a polymer composition that includes branched crystalline polypropylene homopolymer having a heat of fusion of 80 J/g or more; a Branching Index of 0.95 or less wherein said branching is derived solely from polypropylene macromers; and a unimodal molecular weight distribution.

Also disclosed is a composition that includes the combination of any of the polymer compositions described above together with one or more olefin polymers selected from the group consisting of ethylene propylene rubber, ethylene propylene diene monomer rubber, neoprene rubber, styrenic block copolymer rubbers (including SI, SIS, SB, SBS, SIBS rubbers), butyl rubber, halobutyl rubber, star branched butyl rubber, copolymers of isobutylene and para-alkylstyrene, halogenated copolymers of isobutylene and para-alkylstyren, homopolypropylene, propylene copolymerized with up to 50 weight % of ethylene or a C4 to C20 alpha.-olefin, isotactic polypropylene, highly isotactic polypropylene, syndiotactic polypropylene, random copolymer of propylene and ethylene and/or butene and/or hexene, polybutene, ethylene vinyl acetate, low density polyethylene (density 0.915 to less than 0.935 g/cm$^3$) linear low density polyethylene, ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, nylons (polyamides), polycarbonates, PET resins, crosslinked polyethylene, copolymers of ethylene and vinyl alcohol (EVOH), polymers of aromatic monomers such as polystyrene, poly-1 esters, high molecular weight polyethylene having a density of 0.94 to 0.98 g/cm$^3$ low molecular weight polyethylene having a density of 0.94 to 0.98 g/cm$^3$, graft copolymers generally, polyacrylonitrile homopolymer or copolymers, thermoplastic polyamides, polyacetal, polyvinylidine fluoride and other fluorinated elastomers, polyethylene glycols and polyisobutylene.

In certain embodiments of the aforementioned blend composition, the polymer composition can be present in the blend at from 10 to 99 weight %, based upon the weight of the polymers in the blend. Alternatively, the polymer composition can be present in the blend at from 30 to 90 weight %, based upon the weight of the polymers in the blend. Also, the polymer composition can be present in the blend at from 20 to 95 weight % based upon the weight of the polymers in the blend.

In one or more of those compositions, the polymer composition is present in the blend at from 40 to 90 weight % based upon the weight of the polymers in the blend; or from 50 to 90 weight % based upon the weight of the polymers in the blend; or from 60 to 90 weight % based upon the weight of the polymers in the blend; or from 70 to 90 weight % based upon the weight of the polymers in the blend.

Furthermore, described herein is a foam that includes any of the compositions described above; or a blow molded article that that includes any of the compositions described above; or a thermoformed article that includes any of the compositions described above; or a film that includes any of the compositions described above; or a fiber that includes any of the compositions described above; or a sheet that includes any of the compositions described above; or a plaque that includes any of the compositions described above; or a hose that includes any of the compositions described above; or a belt that includes any of the compositions described above; or a tire that includes any of the compositions described above; or a tape that includes any of the compositions described above; or a fabric that includes any of the compositions described above; or nonwoven that includes any of the compositions described above; or a medical garment that includes any of the compositions described above; or a wax crystal modifier that includes any of the compositions described above.

Also described herein is a dynamically vulcanized alloy (DVA) that includes an elastomer and any of the polymer compositions described above. In this respect, DVA's and processes to make DVA's are described in U.S. Pat. No. 6,013,727, particularly column 11, line 64 to column 12, line 43, which is hereby incorporated by reference.

In that dynamically vulcanized alloy, the elastomer can include, for example, one or more of ethylene propylene rubber, ethylene propylene diene monomer rubber, neoprene rubber, styrenic block copolymer rubbers (including SI, SIS, SB, SBS, SIBS rubbers), butyl rubber, halobutyl rubber, star branched butyl rubber, copolymers of isobutylene and para-alkylstyrene, halogenated copolymers of isobutylene and para-alkylstyrene, brominated copolymers of isobutylene and para-methylstyrene, polyisobutylene, natural rubber, and nitrile rubber.

That DVA may include an engineering resin selected from the group consisting of polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrenemaleic anhydride, polyimides, aromatic polyketones, and mixtures thereof.

Also described herein is an adhesive that includes any of the polymer compositions described above together with a tackifier selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters.

The tackifiers that may be blended with the polymers described above are those typically used in the art. Examples include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments the tackifier is non-polar. (Non-polar meaning that the tackifier is substantially free of monomers having polar groups. Preferably the polar groups are not present, however if they are preferably they are not present at more that 5 weight %, preferably not more that 2 weight %, even more preferably no more than 0.5 weight %.) In some embodiments the tackifier has a softening point (Ring and Ball, as measured by ASTM E-28) of 80° C. to 150° C., preferably 100° C. to 130° C.

The tackifier, if present, is typically present at about 1 weight % to about 80 weight %, based upon the weight of the blend, more preferably 2 weight % to 40 weight %, even more preferably 3 weight % to 30 weight %.

Preferred hydrocarbon resins for use as tackifiers or modifiers include (1) Resins such as C5/C6 terpene resins, styrene terpenes, alpha-methyl styrene terpene resins, C9 terpene resins, aromatic modified C5/C6, aromatic modified cyclic resins, aromatic modified dicyclopentadiene based resins or mixtures thereof. Additional preferred resins include those described in WO 91/07472, U.S. Pat. No. 5,571,867, US 5,171,793 and US 4,078,132. Typically these resins are obtained from the cationic polymerization of compositions containing one or more of the following monomers: C5 diolefins (such as 1–3 pentadiene, isoprene, etc); C5 olefins (such as 2-methylbutenes, cyclopentene, etc.); C6 olefins (such as hexene), C9 vinylaromatics (such as styrene, alpha methyl styrene, vinyltoluene, indene, methyl indene, etc.); cyclics (such as dicyclopentadiene, methyldicyclopentadiene, etc.); and or terpenes (such as limonene, carene, etc); and (2) Resins obtained by the thermal polymerization of dicyclopentadiene, and/or the thermal polymerization of dimers or oligomers of cyclopentadiene and/or methylcyclopentadiene, optionally with vinylaromatics (such as styrene, alpha-methyl styrene, vinyl toluene, indene, methyl indene).

The resins obtained after polymerization and separation of unreacted materials, can be hydrogenated if desired. Examples of preferred resins include those described in U.S. Pat. No. 4,078,132; WO 91/07472; U.S. Pat. No. 4,994,516; EP 0 046 344 A; EP 0 082 726 A; and U.S. Pat. No. 5,171,793.

ADDITIONAL SPECIFIC EMBODIMENTS

Certain examples and embodiments of the processes set forth in the claims include utilizing a mixed metallocene catalyst system to produce branched polypropylene, which is preferably crystalline. Preferably, branching is generated or formed during the polymerization reaction. Furthermore, a branched polypropylene having desired properties is preferably formed during polymerization. Thus, no post-polymerization treatment is required (e.g. no crosslinking is required to form branching). Also, no substantial amounts of hydrogen need be added. Preferably, the BCPP formed by the mixed metallocene catalyst system has a unimodal molecular weight distribution. In this respect, such embodiments of the invention can be distinguished from processes that form polymer compositions having bimodal or multimodal molecular weight distributions, found, for example, in certain types of polymer blends or polymers formed by other mixed catalyst processes. Although the use of hydrogen in any of the processes described herein is not necessary for branch formation, small amounts (e.g., up to 100 ppm, or 200 ppm, or from 100–200 ppm) may be included to control molecular weight, as desired. Also, traditional post-reactor molecular weight reducing processes may be used.

At least certain embodiments include a process of preparing a branched polypropylene composition utilizing a mixed metallocene catalyst system, which includes combining a first metallocene compound with a polymerization medium (that includes monomers) in a reactor system to form polypropylene macromers that include propylene monomer units, wherein at least 10%, preferably 30%, of the polypropylene macromers have vinyl chain ends; and combining a second metallocene compound with the polymerization medium in the reactor system to form branched polypropylene polymers that include propylene monomer units of the polypropylene macromers. Preferably, the formed branched polypropylene polymers also include other monomer units, e.g., propylene units that are not part of the polypropylene macromers. Of course, as discussed below, the first and second metallocene compounds can be supported or unsupported, and can be introduced separately, e.g., in a single reactor or even in two in-series reactors; or the two different metallocene compounds can be introduced simultaneously, e.g., being resident on a single catalyst support in desired ratios.

Other embodiments include a process of preparing a branched polypropylene composition from propylene monomers and two different metallocene compounds. That process includes contacting a first portion of the propylene monomers with a first metallocene compound for a time sufficient to form macromers having units derived from at least some of the first portion of propylene monomers, at least 30% of the thus formed macromers having vinyl chain ends (although preferably at least 50% and more preferably at least 70% of those macromers have vinyl chain ends); contacting (either later in the process or at the same time) the macromers and a second portion of propylene monomers with a second metallocene compound for a time sufficient to reduce the number of vinyl chain ends in the macromers having units derived from the first portion of propylene monomers; and forming a branched polypropylene polymer having a main chain that includes units derived from the second portion of propylene monomers and branches formed from the macromers having units derived from the first portion of propylene monomers. The aforementioned process has a number of advantages, in at least certain embodiments, including but not limited to the flexibility of using a single supply of supported catalyst particles that each include the two desired types of metallocene compounds in the desired proportions (e.g., ratio of 25:75); the ability to easily control the desired degree of branching in the polypropylene product, e.g., by the composition of the catalyst system itself; the ability to easily obtain product uniformity by minimizing the number of ingredients; and the ability to obtain a polypropylene composition having a unimodal molecular weight distribution with high yield and desirable properties, particularly high melt strength.

In one or more embodiments of the process described herein, the resulting BCPP not only has a desired amount of branching, but also has high melt strength. The BCPP preferably has a melt flow rate (MFR) within a particular range. That range may have a lower limit of 0.1 dg/min, 0.5 dg/min, or 1.0 dg/min; and the range may have an upper limit of 500 dg/min, 400 dg/min, 300 dg/min, 200 dg/min, 100 dg/min, 50 dg/min, or 35 dg/min, with the melt flow rate ranging from any lower limit to any upper limit, depending on which claimed invention is being referenced. Moreover, the BCPP preferably has a polydispersity within a particular range. That range may have a lower limit of 1.5 or 2.0, for example; and the range may have an upper limit of 15, 10, 8, 7, or 4 with the polydispersity ranging from any lower limit to any upper limit, depending on which claimed invention is being referenced. In preferred processes, a polymerization medium is heated in a reactor system for a time sufficient to produce BCPP in the presence of two or more different metallocene catalysts. Examples of preferred metallocene catalysts are described below. It has been discovered, surprisingly, that a process in which propylene monomers are contacted with the mixed metallocene catalyst systems described herein during polymerization provides a polypropylene with branching and better properties than does a different process, e.g., a process in which propylene monomers are contacted with a single type of metallocene catalyst. Moreover, it has been discovered that the particular type of metallocene catalyst utilized for each of the first metallocene component and the second metallocene plays an important role, and leads to unexpectedly superior properties not achievable using certain other metallocenes.

In a preferred embodiment, polymerization of propylene monomers to form branched polypropylene occurs in a slurry polymerization process, which can also be a bulk process, e.g. no solvent present. The polymerization medium may include monomers, preferably only propylene monomers, but optionally also other monomers. However, diene monomers, such as alpha-omega dienes, should not be included. Also, while the polymerization medium prior to polymerization preferably contains only propylene, an inert solvent (including diluents) may optionally be present, in addition to various additives not directly involved in polymerization, such as scanvengers. The inert solvent may be a hydrocarbon solvent, such as hexane, propane, isobutane, cycloalkane, or aromatic. The polymerization medium preferably includes 30% or more propylene monomers by volume, more preferably 70% or more propylene monomers by volume, and even more preferably 95% or more propylene monomers by volume. Most preferably, the polymerization medium consists entirely or at least essentially of propylene monomers. Preferably, the polymerization medium includes 70% or less inert solvent by volume, more preferably 30% or less inert solvent by volume, and even more preferably 5% or less inert solvent by volume. Most preferably, the polymerization medium does not contain a significant amount of inert solvent, or does not contain any inert solvent.

In at least one preferred embodiment, the only monomer subjected to polymerization, i.e., being part of the polymerization medium, is propylene. That is, no comonomer, e.g., diene or ethylene or other comonomers, are included. Also, in that embodiment, the polymerization medium is preferably contacted with a mixed supported catalyst system (including activators, scavengers, and other compounds that assist in the catalysis), but the polymerization medium preferably does not contact any inert solvent (including any diluent). Thus, neither the propylene monomers nor the resulting macromers nor the final BCPP product should be dissolved or suspended in liquid other than the monomers or some product of polymerization. It is contemplated that such a process is of tremendous usefulness in large scale operations since fewer potential processing problems are likely to develop, e.g., problems relating to the addition of other materials that in the past have been used to provide crosslinking.

As used herein, the term "consisting essentially of" permits a process or composition in which minor amounts of inert or substantially non-reactive materials may be added, e.g., 10% by volume or less, or more preferably 5% or less or even 2% or less by volume. Thus, with the preferred process, at the beginning of polymerization, the polymerization medium should include at least about 80% by volume propylene, preferably 90% or more or more preferably 95% or more propylene.

The polymerizations discussed herein may be conducted in various ways, including batch, semi-batch, or continuous mode, preferably in a continuous mode. Polymerization may be carried out in a single reactor or in multiple reactors. If multiple reactors are used, the reactors may be operated in series and/or in parallel, preferably in series. Not wishing to be bound by theory, it is believed that macromers are formed due to the first metallocene compound and that these macromers are incorporated into a polypropylene main chain that is formed due to polymerization by the second metallocene compound thus resulting in BCPP polypropylene formed in situ.

One illustrative non-limiting example of the polymerization conditions includes utilizing a reactor temperature of 100° C. or less, preferably 75° C. or less, at a pressure from 200 kPa to 15,000 kPa, preferably from 600 kPa to 4,000 kPa. In at least one embodiment, over 2,000 grams of BCPP polypropylene is formed per gram of supported mixed metallocene catalyst system. In another embodiment, 6,000 grams of BCPP polypropylene is formed per gram of unsupported mixed metallocene catalyst system.

In a preferred embodiment, the branched (BCPP) polypropylene is made of at least 50% propylene units, and more preferably the BCPP polypropylene is either a homopolymer, consisting of only propylene units, or a polymer consisting essentially of propylene units, i.e., a polypropylene having trace or minor amounts of comonomer, including alpha-omega dienes and one or more α-olefins, such as ethylene or $C_4$–$C_{20}$ α-olefins, cyclics, or aromatics.

Embodiments of the BCPP polypropylene produced have a Branching Index of less than 1.0, preferably less than 0.98 or 0.95, more preferably less than 0.90, and even more preferably less than 0.80. Since the process disclosed herein does not require the addition of diene monomers or the use of post-polymerization steps (e.g., cross-linking agents or radiation treatments) to produce branched polypropylene, the process is advantageously less complicated than other processes. Nevertheless, the process may further include the addition of diene or the use of post-polymerization steps if increased, or different, branching is desired.

Embodiments of the BCPP polypropylene also have improved extensional viscosity, and improved shear thinning behavior in comparison to linear polypropylene. The BCPP polypropylene preferably has a ratio of extensional viscosity at break to linear viscosity of at least 2.5, more preferably at least 3.0, and most preferably at least 3.5 at strain rates from 0.1 second$^{-1}$ to 1.0 second$^{-1}$. Thus, the BCPP polypropylene has improved processability in comparison to linear polypropylene.

Embodiments of the BCPP polypropylene have increased melt strength in comparison to linear polypropylene. Thus, the BCPP polypropylene is well suited for thermoforming, foaming, blow molding, and other applications which require a melt strength higher than that of linear polypropylene. However, the BCPP polypropylene can be used in various applications, such as thermoforming, foaming, blow molding, extrusion coating, melt blowing, fiber spinning, viscosity modifiers for lube oils, wax crystal modifiers for hydrocarbon fuels, plasticizers, functionalization of polypropylenes, processing aids, thermoplastic elastomers, impact modifiers, compatibilizers, surface modifiers, wettable polypropylenes, high density polypropylenes, elastic polypropylenes. The BCPP polypropylene compositions and their blends with other polymers and/or materials may be used in any fabricated article, such as films, fibers, sheets, plaques, hoes, belts, tires, tapes, wovens, and other dimensional objects. The BCPP polypropylene compositions and their blends with other polymers and/or materials may also be used in radiation resistance articles, for example medical gowns and other medical garments and applications.

Mixed Catalyst Systems

Embodiments of the mixed metallocene catalyst system include two or more different metallocenes. The general definition of "metallocene" is found above. However, in preferred embodiments of the present invention, a process is provided that utilizes certain specific types of metallocenes that are combined in particular proportions; thus, every metallocene is not necessarily appropriate for use in this invention.

For ease of reference, two different metallocenes will be referred to as "first" and "second" metallocenes but this does not imply any order of addition, use or any other process parameter.

In one or more specific embodiments, wherein a first metallocene compound and a second metallocene compound are used, the first metallocene compound is preferably an alkyl bridged metallocene compound that has at least two indenyl rings or derivatives of indenyl rings, each preferably being substituted at the 4 and/or 7 positions. The second metallocene compound is preferably a silyl bridged metallocene compound. Also, the second metallocene is preferably capable of producing high molecular weight, high tacticity polypropylene polymers (when used alone, i.e., without any other catalyst). Preferred second metallocenes have at least two indenyl rings or substituted indenyl rings, each ring preferably being substituted at the 2 and 4 positions. The 4 position substitution is preferably an aryl substituent that is yet further substituted as described below. Depending on the activity of each metallocene selected, the molar amount of the second metallocene compound contacting the polymerization mixture may be greater than the molar amount of the first metallocene compound contacting the polymerization mixture.

The chiral metallocenes may be used as a racemate for the preparation of highly isotactic polypropylene polymers and copolymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known literature techniques. For special products it is also possible to use rac/meso mixtures.

The mixed metallocene catalyst system preferably includes the first metallocene compound and the second metallocene compound in a molar ratio of from 50:50 to 100:1, preferably in a ratio of from 50:50 to 5:95, more preferably in a ratio of from 50:50 to 25:75. That is, more of the second metallocene compound is used relative to the first metallocene compound. The molar ratio is determined on the basis on the amount of the first metallocene compound and the amount of the a second metallocene compound combined with the polymerization mixture, e.g., added to the reactor system (if added simultaneously). Not wishing to be bound by theory, it is contemplated that the first metallocene compound promotes production of a certain amount of low molecular weight macromers. In at least one feature of certain embodiments, at least some of the macromers having vinyl chain ends. Preferably, the first metallocene compound results in formation of polypropylene macromers in which 30% or more of the macromers have a vinyl chain end. In another embodiment, the first metallocene compound produces low molecular weight polypropylene macromers having a weight average molecular weight (Mw) below 150,000 Daltons, and preferably below 100,000 Daltons, or even below 75,000 Daltons, e.g., from 10 Daltons to 50,000 Daltons. It is contemplated that the second metallocene compound incorporates the low molecular weight macromers produced by the first metallocene compound into the main chain of a polypropylene to form branched polypropylene. The branched polypropylene polymer preferably has a weight average molecular weight (Mw) within a particular range. That range may have a lower limit of 30,000 Daltons, 50,000 Daltons, 70,000 Daltons, or 100,000 Daltons; and the range may have an upper limit of 2,000,000 Daltons, 1,000,000 Daltons, 750,000 Daltons, 500,000 Daltons, or 300,000 Daltons, with the weight average molecular weight ranging from any lower limit to any upper limit, depending on which claimed invention is being referenced.

It is contemplated that the first metallocene compound polymerizes monomers in a primarily beta-methyl elimination mechanism to form polypropylene macromers with a high amount of vinyl chain ends. As a consequence, polymerization of monomers by the first metallocene compound is believed to produce propylene macromers. In contrast, it is contemplated that the second metallocene compound polymerizes monomers in a primarily beta-hydride elimination mechanism to form the branched crystalline polypropylene polymer with a low amount of vinyl chain ends.

First Metallocene Compound

One or more embodiments of the first metallocene compound includes an ethylene-bridged bis-cyclopentadienyl metallocene, more preferably an ethylene-bridged bis-indenyl metallocene. Particularly preferred ethylene-bridged bis-indenyl metallocenes are compounds of the general structure (B):

(B):

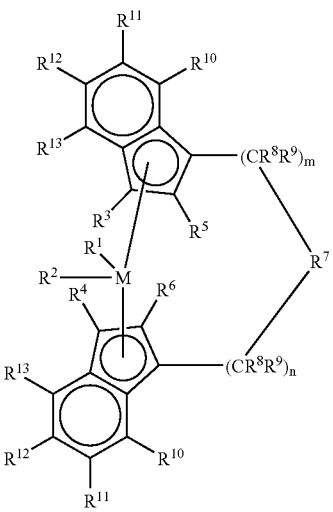

wherein: M is a metal of Group 4, 5, or 6 of the Periodic Table, for example titanium, zirconium, hafnium, vanadium, niobium, tantalum, chromium, molybdenum and tungsten, preferably, zirconium, hafnium and titanium, most preferably zirconium and hafnium;

$R^1$ and $R^2$ are identical or different, and are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, or a halogen atom, or a conjugated diene which is optionally substituted with one or more hydrocarbyl, tri(hydrocarbyl) silyl groups or hydrocarbyl, tri(hydrocarbyl)silylhydrocarbyl groups, said diene having up to 30 atoms not counting hydrogen;

$R^3$ and $R^4$ are defined the same as are $R^1$ and $R^2$;

$R^5$ and $R^6$ are identical or different, and are one of a hydrogen atom, a halogen atom, a $C_1$–$C_{10}$ alkyl group, which may be halogenated, a $C_6$–$C_{10}$ aryl group, which may be halogenated, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein: $R^{15}$ is one of a halogen atom, a $C_1$–$C_{10}$ alkyl group, or a $C_6$–$C_{10}$ aryl group;

R7 is

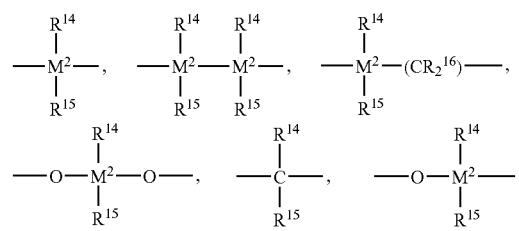

—B(R$^{14}$)—, —Al(R$^{14}$)—, —Ge—, —Sn—, —O—, —S—, —SO—, —SO$_2$—, —N(R$^{14}$)—, —CO—, —P(R$^{14}$)—, or —P(O)(R$^{14}$)—;

wherein: R$^{14}$, R$^{15}$ and R$^{16}$ are identical or different and are a hydrogen atom, a halogen atom, a C$_1$–C$_{20}$ branched or linear alkyl group, a C$_1$–C$_{20}$ fluoroalkyl or silaalkyl group, a C$_6$–C$_{30}$ aryl group, a C$_6$–C$_{30}$ fluoroaryl group, a C$_1$–C$_{20}$ alkoxy group, a C$_2$–C$_{20}$ alkenyl group, a C$_7$–C$_{40}$ arylalkyl group, a C$_8$–C$_{40}$ arylalkenyl group, a C$_7$–C$_{40}$ alkylaryl group, or R$^{14}$ and R$^{15}$, together with the atoms binding them, form a cyclic ring;

M$^2$ is carbon, silicon, germanium or tin;

R$^8$ and R$^9$ are R$^8$ and R$^9$, are identical or different, and have the meanings stated for R$^5$ and R$^6$;

R$^{10}$, R$^{11}$, R$^{12}$ and R$^{13}$ are identical or different and have the meanings stated for R$^5$ and R$^6$; wherein at least one of R$^{13}$ and R$^{10}$ are identical or different, and are one of a hydrogen atom, a halogen atom, a C$_1$–C$_{10}$ alkyl group, which may be halogenated, a C$_6$–C$_{10}$ aryl group, which may be halogenated, a C$_2$–C$_{10}$ alkenyl group, a C$_7$–C$_{40}$ arylalkyl group, a C$_7$–C$_{40}$ alkylaryl group, a C$_8$–C$_{40}$ arylalkenyl group, a —NR$_2^{15}$, —SR$^{15}$, —OR$^{15}$, —OSiR$_3^{15}$ or —PR$_2^{15}$ radical, wherein: R$^{15}$ is one of a halogen atom, a C$_1$–C$_{10}$ alkyl group, or a C$_6$–C$_{10}$ aryl group;

m and n are identical or different and are zero, 1 or 2, m plus n is zero, 1 or 2, and Illustrative but non-limiting examples of some ethylene-bridged bis-indenyl metallocenes include:

1,2-Ethandiylbis(2-methyl-4,6-diisopropyl-1-indenyl) ZrCl$_2$;
1,2-Ethandiylbis(2-methyl-4,5-benzo-1-indenyl)ZrCl$_2$;
1,2-Ethandiylbis(2,4,7-trimethyl-1-indenyl)ZrCl$_2$;
1,2-Ethandiylbis(2-methyl-1-indenyl)ZrCl$_2$;
rac-1,2-ethylenebis(4,7-dimethyl-tetrahydroindenyl)]HfCl$_2$;
rac-1,2-ethylenebis(4,7-dimethyl-indenyl)]HfCl$_2$;
1,2-Ethandiylbis(2-methyl-4,6-diisopropyl-1-indenyl) HfCl$_2$;
1,2-Ethandiylbis(2-methyl-4,5-benzo-1-indenyl)HfCl$_2$;
1,2-Ethandiylbis(2,4,7-trimethyl-1-indenyl)HfCl$_2$;
1,2-Ethandiylbis(2-methyl-1-indenyl)ZrCl$_2$; and the like, including alkyl dichloride species.

Preferred ethylene-bridged bis-indenyl metallocenes and ethylene-bridged bis-tetrahydroindenyl metallocenes include rac-1,2-ethylenebis(4,7-dimethyl-tetrahydroindenyl)] hafnium dichloride and rac-1,2-ethylenebis(4,7-dimethyl-indenyl)]hafnium dichloride.

In at least one embodiment, the transition metal of the first metallocene compound is preferably hafnium. It is believed that polypropylene formed using hafnium metallocenes (hafnocenes) have increased amount of vinyl chain ends in comparison to polypropylene formed using metallocenes comprising other transition metals.

Second Metallocene Compound

The second metallocene compound preferably includes a silyl-bridged bis-cyclopentadienyl metallocene, more preferably a silyl-bridged bis-indenyl metallocene, which may be substituted. Preferred embodiments of the second metallocene compounds are described in greater detail below. Alternatively, it is contemplated that the second metallocene may be one that, when used alone, i.e., without any other catalyst compound, is capable of producing syndiotactic, rather than isotactic polypropylene. Thus, in embodiments of the process using such metallocene compounds, it is contemplated that macromers produced by a first metallocene compound are incorporated into a syndiotactically arranged backbone by the second metallocene. Syndiotactic producing metallocenes are very well known in the art. For example, U.S. Pat. Nos. 6,184,326 and 4,892,851 describe such metallocenes in detail, along with methods for making them, and each such description is fully incorporated herein by reference. Common syndio-specific metallocenes are generally a combination of cyclopentadienyl and fluorenyl ligands, which may be substituted.

Particularly preferred bis-indenyl metallocenes are compounds of the general formula:

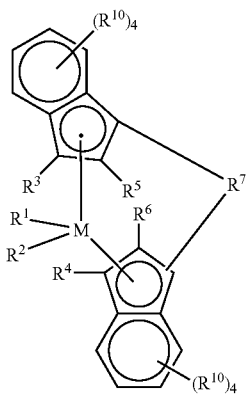

wherein: M is a metal of Group 4, 5, or 6 of the Periodic Table preferably, zirconium, hafnium and titanium, most preferably zirconium;

R$^1$ and R$^2$ are identical or different, preferably identical, and are one of a hydrogen atom, a C$_1$–C$_{10}$ alkyl group, preferably a C$_1$–C$_3$ alkyl group, a C$_1$–C$_{10}$ alkoxy group, preferably a C$_1$–C$_3$ alkoxy group, a C$_6$–C$_{10}$ aryl group, preferably a C$_6$–C$_8$ aryl group, a C$_6$–C$_{10}$ aryloxy group, preferably a C$_6$–C$_8$ aryloxy group, a C$_2$–C$_{10}$ alkenyl group, preferably a C$_2$–C$_4$ alkenyl group, a C$_7$–C$_{40}$ arylalkyl group, preferably a C$_7$–C$_{10}$ arylalkyl group, a C$_7$–C$_{40}$ alkylaryl group, preferably a C$_7$–C$_{12}$ alkylaryl group, a C$_8$–C$_{40}$ arylalkenyl group, preferably a C$_8$–C$_{12}$ arylalkenyl group, or a halogen atom, preferably chlorine; or a conjugated diene which is optionally substituted with one or more hydrocarbyl, tri(hydrocarbyl) silyl groups or hydrocarbyl, tri(hydrocarbyl) silylhydrocarbyl groups, said diene having up to 30 atoms not counting hydrogen;

R$^5$ and R$^6$ are identical or different, preferably identical, are one of a hydrogen atom, a halogen atom, preferably a fluorine, chlorine or bromine atom, a C$_1$–C$_{10}$ alkyl group, preferably a C$_1$–C$_4$ alkyl group, which may be halogenated, a C$_6$–C$_{10}$ aryl group, which may be halogenated, preferably a C$_6$–C$_8$ aryl group, a C$_2$–C$_{10}$ alkenyl group, preferably a C$_2$–C$_4$ alkenyl group, a C$_7$–C$_{40}$ arylalkyl group, preferably a C$_7$–C$_{10}$ arylalkyl group, a C$_7$–C$_{40}$ alkylaryl group, preferably a C$_7$–C$_{12}$ alkylaryl group, a C$_8$–C$_{40}$ arylalkenyl group, preferably a C$_8$–C$_{12}$ arylalkenyl group, a —NR$_2^{15}$, —SR$^{15}$, —OR$^{15}$, —OSiR$_3^{15}$ or —PR$_2^{15}$ radical, wherein: R$^{15}$ is one of a halogen atom, preferably a chlorine atom, a C$_1$–C$_{10}$ alkyl group, preferably a C$_1$–C$_3$ alkyl group, or a C$_6$–C$_{10}$ aryl group, preferably a C$_6$–C$_9$ aryl group;

$R^7$ is

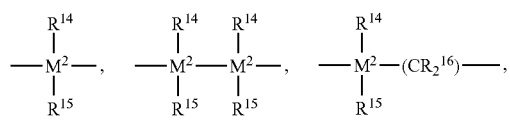

—B($R^{14}$)—, —Al($R^{14}$)—, —Ge—, —Sn—, —O—, —S—, —SO—, —SO$_2$—, —N($R^{14}$)—, —CO—, —P($R^{14}$)—, or —P(O)($R^{14}$)—;

wherein: $R^{14}$, $R^{15}$ and $R^{16}$ are identical or different and are a hydrogen atom, a halogen atom, a $C_1$–$C_{20}$ branched or linear alkyl group, a $C_1$–$C_{20}$ fluoroalkyl or silaalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{14}$ and $R^{15}$, together with the atoms binding them, form a cyclic ring;

preferably, $R^{14}$, $R^{15}$ and $R^{16}$ are identical and are a hydrogen atom, a halogen atom, a $C_1$–$C_4$ alkyl group, a $CF_3$ group, a $C_6$–$C_8$ aryl group, a $C_6$–$C_{10}$ fluoroaryl group, more preferably a pentafluorophenyl group, a $C_1$–$C_4$ alkoxy group, in particular a methoxy group, a $C_2$–$C_4$ alkenyl group, a $C_7$–$C_{10}$ arylalkyl group, a $C_9$–$C_{12}$ arylalkenyl group, or a $C_7$–$C_{14}$ alkylaryl group;

or, $R^7$ is represented by the formula:

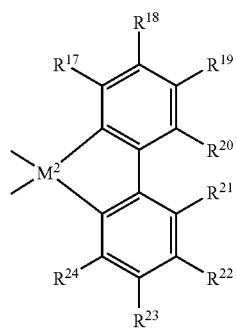

wherein: $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings; preferably, $R^{17}$ to $R^{24}$ are hydrogen;

$M^2$ is carbon, silicon, germanium or tin;

the radicals $R^3$, $R^4$, and $R^{10}$ are identical or different and have the meanings stated for $R^5$ and $R^6$, or two adjacent $R^{10}$ radicals are joined together to form a ring, preferably a ring containing from about 4–6 carbon atoms.

Particularly preferred second metallocenes are those of the formula:

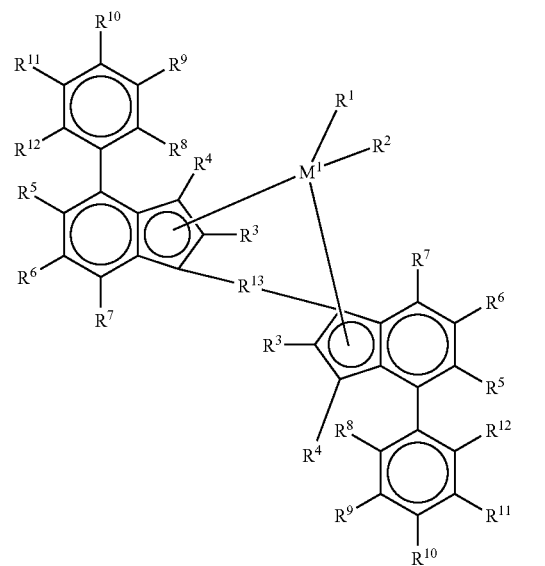

(I)

wherein: $M^1$ is selected from the group consisting of titanium, zirconium, hafnium, vanadium, niobium, tantalum, chromium, molybdenum and tungsten, preferably zirconium, hafnium or titanium, most preferably zirconium;

$R^1$ and $R^2$ are identical or different, and are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_{40}$ alkenyl group, a $C_7$–$C_{40}$ arylalkyl group, a $C_7$–$C_{40}$ alkylaryl group, a $C_8$–$C_{40}$ arylalkenyl group, an OH group or a halogen atom; $R^1$ and $R^2$ may also be joined together to form an alkanediyl group or a conjugated $C_{4-40}$ diene ligand which is coordinated to $M^1$ in a metallocyclopentene fashion; $R^1$ and $R^2$ may also be identical or different conjugated dienes, optionally substituted with one or more hydrocarbyl, tri(hydrocarbyl)silyl groups or hydrocarbyl, tri(hydrocarbyl) silylhydrocarbyl groups, said dienes having up to 30 atoms not counting hydrogen and forming a π complex with M, examples include 1,4-diphenyl-1,3-butadiene, 1,3-pentadiene, 2-methyl-1,3-pentadiene, 2,4-hexadiene, 1-phenyl-1,3-pentadiene, 1,4-dibenzyl-1,3-butadiene, 1,4-ditolyl-1,3-butadiene, 1,4-bis(trimethylsilyl)-1,3-butadiene, and 1,4-dinaphthyl-1,3-butadiene;

preferably $R^1$ and $R^2$ are identical and are a $C_1$–$C_3$ alkyl or alkoxy group, a $C_6$–$C_8$ aryl or aryloxy group, a $C_2$–$C_4$ alkenyl group, a $C_7$–$C_{10}$ arylalkyl group, a $C_7$–$C_{12}$ alkylaryl group, or a halogen atom, preferably chlorine;

$R^3$ are identical or different and are each a hydrogen atom, a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —NR'$_2$, —SR', —OR, —OSiR'$_3$ or —PR'$_2$ radical, wherein R' is one of a halogen atom, a $C_1$–$C_{10}$ alkyl; group, or a $C_6$–$C_{10}$ aryl group; preferably $R^3$ is not a hydrogen atom;

preferably each $R^3$ is identical and is a fluorine, chlorine or bromine, atom, a $C_1$–$C_4$ alkyl group which may be halogenated, a $C_6$–$C_8$ aryl group which may be halogenated, a —NR'$_2$, —SR', —OR', —OSiR'$_3$ or —PR'$_2$ radical, wherein R' is one of a chlorine atom, a $C_1$–$C_4$ alkyl group, or a $C_6$–$C_8$ aryl group;

$R^4$ to $R^7$ are identical or different and are hydrogen, or are as defined for $R^3$ or two or more adjacent radicals $R^5$ to $R^7$ together with the atoms connecting them form one or more rings, preferably a 6-membered ring, preferably 4–8 membered ring;

$R^{13}$ is

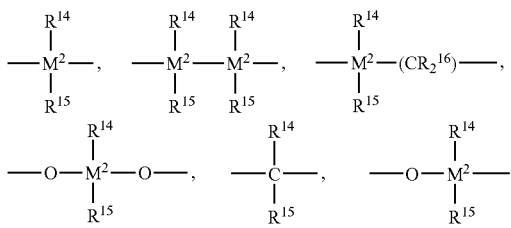

—B($R^{14}$)—, —Al($R^{14}$)—, —Ge—, —Sn—, —O—, —S—, —SO—, —SO$_2$—, —N($R^{14}$)—, —CO—, —P($R^{14}$)—, or —P(O)($R^{14}$)—;

wherein: $R^{14}$, $R^{15}$ and $R^{16}$ are identical or different and are a hydrogen atom, a halogen atom, a $C_1$–$C_{20}$ branched or linear alkyl group, a $C_1$–$C_{20}$ fluoroalkyl or silaalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{14}$ and $R^{15}$, together with the atoms binding them, form a cyclic ring;

preferably, $R^{14}$, $R^{15}$ and $R^{16}$ are identical and are a hydrogen atom, a halogen atom, a $C_1$–$C_4$ alkyl group, a $CF_3$ group, a $C_6$–$C_8$ aryl group, a $C_6$–$C_{10}$ fluoroaryl group, more preferably a pentafluorophenyl group, a $C_1$–$C_4$ alkoxy group, in particular a methoxy group, a $C_2$–$C_4$ alkenyl group, a $C_7$–$C_{10}$ arylalkyl group, a $C_8$–$C_{12}$ arylalkenyl group, or a $C_7$–$C_{14}$ alkylaryl group;

or, $R^{13}$ is represented by the formula:

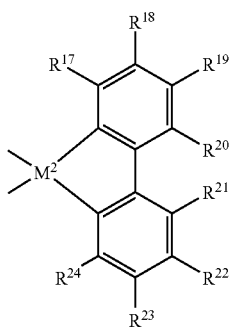

wherein: $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings; preferably, $R^{17}$ to $R^{24}$ are hydrogen;

$M^2$ is one or more carbons, silicon, germanium or tin, preferably silicon;

$R^{13}$ may also be an amidoborane-type radical such as is described in WO00/20426 (herein fully incorporated by reference);

$R^8$, $R^9$, $R^{10}$, $R^{11}$ and $R^{12}$ are identical or different and have the meanings stated for $R^4$ to $R^7$.

In at least one embodiment, the transition metal of the second metallocene compound is preferably zirconium. It is believed that polypropylene formed using zirconium metallocenes (zirconocenes) have increased catalyst activity in comparison to hafnocenes.

Preferred silyl-bridged bis-indenyl metallocenes of the second metallocene includes silyl-bridged bis-indenyl zirconocenes, such as the silyl-bridged bis-indenyl zirconocenes described above. A preferred silyl-bridged bis-indenyl zirconocene is dimethylsilylbis(2-methyl-4-phenyl indenyl)zirconium dichloride.

Activators.

The terms "cocatalyst" and "activator" are used herein interchangeably and are defined to be any compound or component which can activate a bulky ligand transition metal compound, e.g., any of the metallocenes defined above. Alumoxane may be used as an activator. A variety of methods can be used for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each of which is fully incorporated herein by reference. It may be preferable to use a visually clear methylalumoxane. A cloudy or gelled alumoxane can be filtered to produce a clear solution or clear alumoxane can be decanted from the cloudy solution.

Also useful in the described processes are ionizing activators, neutral or ionic, or compounds such as dimethylanilinium tetrakis(perfluorophenyl) boron (DICOP) and tri(n-butyl)ammonium tetrakis(pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators are also contemplated for use in the process, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-30 92/00333 (incorporated herein by reference). These teach a preferred method of preparation wherein metallocenes (bis Cp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this disclosure are those which are compatible, stabilize the metallocene cation in the sense of balancing its ionic charge in a +1 state, yet retain sufficient liability to permit displacement by an ethylenically or acetylenically unsaturated monomer during polymerization.

The use of ionizing ionic compounds not containing an active proton but capable of producing both the active metallocene cation and an noncoordinating anion is also known. See, EP-A-0 426 637 and EP-A-0 573 403 (incorporated herein by reference). An additional method of making the ionic catalysts uses ionizing anion precursors which are initially neutral Lewis acids but form the cation and anion upon ionizing reaction with the metallocene compounds, for example the use of tris(pentafluorophenyl) boron. See, EP-A-0 520 732 (incorporated herein by reference). Ionic catalysts for addition polymerization can also be prepared by oxidation of the metal centers of transition metal compounds by anion precursors containing metallic oxidizing groups along with the anion groups. See, EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See, EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Catalyst Supports

The metallocenes referenced herein may be supported using a porous particulate material, such as for example, talc, inorganic oxides, inorganic chlorides and resinous materials such as polyolefin or polymeric compounds.

Preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

Preferably the support material is porous silica which has a surface area in the range of from about 10 to about 700 $m^2/g$, a total pore volume in the range of from about 0.1 to about 4.0 cc/g and an average particle size in the range of from about 10 to about 500 μm. More preferably, the surface area is in the range of from about 50 to about 500 $m^2/g$, the pore volume is in the range of from about 0.5 to about 3.5 cc/g and the average particle size is in the range of from about 20 to about 200 μm. Most preferably the surface area is in the range of from about 100 to about 400 $m^2/g$, the pore volume is in the range of from about 0.8 to about 3.0 cc/g and the average particle size is in the range of from about 30 to about 100 μm. The average pore size of typical porous support materials is $\geq$10 Å. Preferably, a support material is used that has an average pore diameter of $\geq$50 Å and most preferably it is in the range of from about 75 to about 350 Å. It may be particularly desirable to dehydrate the silica at a temperature of from about 100° C. to about 800° C. anywhere from about 3 to about 24 hours.

The metallocenes, activator and support material may be combined in any number of ways. Suitable support techniques are described in U.S. Pat. Nos. 4,808,561 and 4,701,432 (each fully incorporated herein by reference.). Preferably the metallocenes and activator are combined and their reaction product supported on the porous support material as described in U.S. Pat. No. 5,240,894 and WO 94/28034, WO 96/00243, and WO 96/00245 (each fully incorporated herein by reference.) Alternatively, the metallocenes may be preactivated separately and then combined with the support material either separately or together. If the metallocenes and activator are separately supported, then preferably, they are dried then combined as a powder before use in polymerization. Regardless of whether the metallocene and activator are separately precontacted or whether the metallocene and activator are combined at once, two or more metallocene compounds may be supported together (co-deposit) or separately (physical blend).

The total volume of reaction solution applied to porous support is preferably less than about 4 times the total pore volume of the porous support, more preferably less than about 3 times the total pore volume of the porous support and even more preferably in the range of from more than about 1 to less than about 2.5 times the total pore volume of the porous support. Procedures for measuring the total pore volume of porous support are well known in the art. The preferred method is described in Volume 1, Experimental Methods in Catalyst Research, Academic Press, 1968, pages 67–96.

Methods of supporting ionic catalysts including metallocene cations and noncoordinating anions are described in WO 91/09882, WO 94/03506, WO 96/04319 and U.S. Pat. No. 5,643,847 (incorporated herein by reference). The methods generally include either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

The supported catalyst system may be used directly in polymerization or the catalyst system may be prepolymerized using methods well known in the art. The supported catalyst is typically added to the polymerization medium as a suspension in mineral oil. For details regarding prepolymerization, see U.S. Pat. Nos. 4,923,833 and 4,921,825, EP 0 279 863 and EP 0 354 893 each of which is fully incorporated herein by reference.

For preparation of the branched polypropylene, preactivation of the metallocene may be advantageous. For example, it is widely known in the art that preactivation of the metallocene before addition to a continuous reactor yields higher activities than continuous addition of metallocene and activator in two separate streams. Furthermore, it may be advantageous to control precontacting time to maximize catalyst effectiveness, e.g., avoiding excessive aging of the activated catalyst composition.

EXAMPLES

Example 1

In the following example, various samples of polypropylene were formed using mixed metallocene catalyst systems and single metallocene catalyst systems. The properties of the samples are reflected in Table 1.

Each sample was formed using supported catalysts. The catalysts were supported by placing the metallocene catalyst system in a 100 ml beaker to which a 30 wt % MAO solution was added. The mixture was stirred magnetically for 1 hour and was diluted with 10 grams of toluene. Five grams of Davison MS952 silica pre-calcined at 600° C. were placed in a 250 ml beaker separately. One-fourth of the metallocene mixture was added carefully to the silica and the resulting mixture was stirred manually to achieve homogeneity and uniform color. The rest of the metallocene mixture was then added to the silica as above to achieve a mobile slurry. The entire mixture was transferred to a 250 ml round-bottom flask, and was dried under vacuum. The yield was calculated and the metal loading was analyzed.

Sample 1 is an example of polypropylene made from 1200 ml propylene and 200 mg of dimethylsilylbis(2-methyl-4-phenyl-1-indenyl)zirconium dichloride (called "Catalyst Q") with dimethylanilinium tetrakis (perfluorophenyl) boron activator (DICOP). Sample 2 is an example of polypropylene made from 1200 ml propylene and 100 mg of dimethylsilanylbis(2-methyl-indenyl) zirconium dichloride (called "Catalyst L") with methylalumoxane activator (MAO). Sample 3 is a polypropylene made from 1200 ml propylene and a mixture of 100 mg of Catalyst Q with DICOP activator and 50 mg of Catalyst L with methylalumoxane activator (MAO).

The polymerizations were each conducted separately in a batch reactor at a reactor temperature (i.e., polymerization temperature) of 75° C. with the stirrer set at 800 rpm for 60 min. For Sample 1, the propylene was added in two intervals. First, 800 ml of propylene at room temperature was added to the reactor. The catalyst was then flushed with 400 ml of propylene at room temperature and introduced to the reactor through a catalyst tube (2 ml of hexane was added to the catalyst tube). The reactor was then heated slowly to 75° C. Triethyl aluminum scavenger, (1 ml, 25 wt % in toluene) was charged to the reactor through a stainless steel tube. The reactor pressure was maintained between 233.1 psig and 518.7 psig. For Sample 2 the propylene was added in two intervals. First, 800 ml of propylene at room temperature was added to the reactor. The reactor was then heated slowly to 75° C. The catalyst was then flushed with 400 ml of propylene and introduced to the reactor through a catalyst tube (2 ml of hexane was added to the catalyst tube). Triethyl aluminum scavenger (1 ml, 25 wt % in toluene) was charged to the reactor through a stainless steel tube. The reactor pressure was maintained between 486.1 psig and 493.1 psig. For Sample 3, the propylene was added in two intervals. First, 800 ml of propylene at room temperature was added to the reactor. The reactor was then heated slowly to 75° C. The catalyst was then flushed with 400 ml of propylene with high pressure $N_2$ and introduced to the reactor through a catalyst tube. The triethyl aluminum scavenger (1 ml, 25 wt % in toluene) was charged to the reactor through a stainless tube. The reactor pressure was maintained between 497.0 psig and 513.1 psig. Each polymerization reaction yielded a polypropylene sample. Each of the polypropylene samples was characterized using $^1$H NMR, DSC, and GPC methods.

TABLE 1

| | Sample | | |
|---|---|---|---|
| | 1 | 2 | 3 |
| Catalyst | Q (200 mg) | L (100 mg) | Q (100 mg) + L (50 mg) |
| Yield (g) | 226 | 43.5 | 179 |
| Catalyst Productivity (g polymer/g cat/hr) | 1130 | 435 | 1193 |
| Vinyl % | 12.5 | 6.7 | 0 |

TABLE 1-continued

| | Sample | | |
|---|---|---|---|
| | 1 | 2 | 3 |
| GPC-DRI | | | |
| $M_w$ (kDaltons) | 556 | 129 | 401 |
| $M_n$ (kDaltons) | 196 | 59 | 110 |
| PD | 2.8 | 2.2 | 3.6 |
| GPC-VIS | | | |
| $M_w$ (kDaltons) | 637 | 142 | 455 |
| $M_n$ (kDaltons) | 207 | 65 | 117 |
| PD | 3.1 | 2.2 | 3.9 |
| Branching Index (g') | 0.967 | 0.892 | 0.93 |
| DSC | | | |
| $T_m$ (° C.) | 151.1 | 146.7 | 152.2 |
| $T_c$ (° C.) | 104.8 | 103.9 | 106.8 |

Example 2

In the following example, various samples of polypropylene were formed using mixed metallocene catalyst systems and single metallocene catalyst systems. The properties of the samples are reflected in Table 2.

Each sample was formed using supported catalysts. The catalysts were supported by placing the metallocene catalyst system in a 100 ml beaker to which a 30 wt % MAO solution was added. The mixture was stirred magnetically for 1 hour and was diluted with 10 grams of toluene. Five grams of Davison MS952 silica pre-calcined at 600° C. were placed in a 250 ml beaker separately. One-fourth of the metallocene mixture was added carefully to the silica and the resulting mixture was stirred manually to achieve homogeneity and uniform color. The rest of the metallocene mixture was then added to the silica as above to achieve a mobile slurry. The entire mixture was transferred to a 250 ml round-bottom flask, and was dried under vacuum. The yield was calculated and the metal loading was analyzed.

Sample 4 is a commercial linear polypropylene, produced by ExxonMobil Chemical Co. under the trademark ACHIEVE. Sample 5 is a polypropylene made from 100 mg of dimethylsilylbis(2-methyl-4-phenyl indenyl)zirconium dichloride (Catalyst Q) supported catalyst. Sample 6 is a polypropylene made from 400 mg of rac-1,2-ethylenebis(4,7-dimethyl-indenyl)hafnium dichloride (called "Catalyst B") supported catalyst, purchased from Boulder Scientific Company. Sample 7 is a polypropylene made from 100 mg of supported Catalyst Q and Catalyst B. Sample 8 is a polypropylene made from 100 mg of supported Catalyst Q and Catalyst B. Sample 9 is a polypropylene made from 200 mg of the supported Catalyst Q and Catalyst B. Sample 10 is made from 100 mg of the supported Catalyst Q and 100 mg of the supported Catalyst B.

The polymerizations were conducted in a 2 L Zipperclave reactor using a mixture of propylene (30% by volume) and hexane diluent (70% by volume) for 60 minutes. The reactor was heated to the set temperature of 75° C. and equilibrated for 5 minutes. The triethyl aluminum scavenger (1 ml, 1 M solution in toluene) was charged to the reactor through a stainless steel tube. The supported catalyst (100–200 mg in 2 ml hexane) was injected into the reactor through a catalyst tube. The polymerization mixture was allowed to react for 60 minutes. The reactor was cooled to 25° C. and vented. The polymer was collected by filtration, washed with hexane, dried by $N_2$ purge overnight and then weighed.

The samples were characterized using $^1$H NMR, DSC, and GPC methods. Samples 7–10 had high $M_w$ valves and broad molecular weight distributions. Samples 7–10 also had high melting points, high polydispersities, and fewer vinyl chain-ends than would be expected as an average of the two separately catalyzed polymerization products. Samples 7–10 each had a unimodal molecular weight distribution. Surprisingly, Sample 7 had a unimodal molecular weight distribution, even though Sample 7 was made using one of the same catalysts found in Sample 6 (single catalyst), which was observed to have a bimodal molecular weight distribution.

ported catalyst. Sample 13 is an invention polypropylene made from 0.35 of dimethylsilylbis(2-methyl-4-phenyl indenyl)zirconium dichloride (Catalyst Q) unsupported catalyst. Sample 14 is an invention polypropylene made from 0.175 g of unsupported Catalyst A and 0.35 g of unsupported Catalyst Q. Sample 15 is a polypropylene made from 0.175 of unsupported Catalyst B and 0.35 of unsupported Catalyst Q.

The polymerizations were conducted for 60 minutes in a batch reactor using a mixture from 30 to 100% by volume propylene and from 0 to 70% by volume hexane diluent. The reactor was heated to the set temperature of 75° C. and equili-

TABLE 2

| | Sample | | | | | | |
|---|---|---|---|---|---|---|---|
| | 4 | 5 | 6 | 7 | 8 | 9 | 10 |
| Supported Catalyst | Commercial | Q/MAO (100 mg) | B/MAO (400 mg) | $(Q + B)_1$/ MAO (100 mg) | $(Q + B)_2$/ MAO (100 mg) | $(Q + B)_3$/ MAO (200 mg) | Q/MAO (100 mg) + B/MAO (100 mg) |
| Supported Catalyst Data | | | | | | | |
| Metallocene (mg/mmol) | | 0.09/ 0.14 | 0.08/ 0.14 | 0.057/ 0.091 + 0.033/ 0.059 | 0.057/ 0.091 + 0.017/ 0.03 | 0.09/ 0.14 + 0.003/ 0.005 | |
| MAO (g) | | 4.65 | 4.65 | 4.88 | 3.94 | 4.81 | |
| Al (mmol) | | 24.1 | 24.1 | 25.3 | 20.4 | 24.9 | |
| Final Loading Metal (mmol/g) | | 0.022 | 0.022 | 0.014/ 0.009 | 0.015/ 0.0048 | 0.21/ 0.0008 | |
| Vinyl % | | 28 | 39 | 22 | 16 | 22 | 25 |
| GPC-DRI | | | | | | | |
| $M_w$ (kDaltons) | 197 | 568 | 56 | 576 | 535 | 580 | 489 |
| $M_n$ (kDaltons) | 66 | 198 | 17 | 190 | 140 | 197 | 138 |
| PD | 3 | 2.9 | 3.3 | 3 | 3.8 | 2.9 | 3.6 |
| GPC-VIS | | | | | | | |
| $M_w$ (kDaltons) | 209 | 591 | 57 | 608 | 580 | 612 | 517 |
| $M_n$ (kDaltons) | 54 | 186 | 18 | 130 | 78 | 207 | 155 |
| PD | 3.9 | 3.2 | 3.2 | 4.7 | 7.4 | 3 | 3.7 |
| Branching Index (g') | 0.998 | 0.956 | 1.022 | 0.942 | 0.916 | 0.934 | 0.937 |
| DSC | | | | | | | |
| $T_m$ (° C.) | — | 145 | 135 | 146 | 144 | 147 | 146 |
| $T_c$ (° C.) | — | 107 | 103 | 110 | 107 | 110 | 107 |
| $H_f$ (J/g) | — | 101.4 | 81.8 | 92.6 | 99.1 | 96.7 | 88.7 |
| Percent Crystallinity | — | 53.7 | 43.3 | 49 | 52.4 | 51.2 | 46.9 |

Example 3

In the following example, various samples of polypropylene were formed by mixed metallocene catalyst systems and single metallocene catalyst systems. The properties of the samples are reflected in Table 3. Note the surprisingly high productivities of the mixed metallocene catalyst system.

Sample 11 is a comparative example of polypropylene made from 0.35 mg of the rac-1,2-ethylenebis(4,7-dimethyl-tetrahydro indenyl)hafnium dichloride (called "Catalyst A") unsupported catalyst, purchased from Boulder Scientific Company. Sample 12 is a comparative example of polypropylene made from 0.35 mg of the rac-1,2-ethylenebis(4,7-dimethyl-indenyl)hafnium dichloride (Catalyst B) unsupbrated for 5 min. Triethyl aluminum scavenger (1 ml, 1 M solution) was introduced to the reactor through a stainless steel tube. The stock solutions of the catalysts, Q, A, and B in toluene (2 mg/6 ml) were prepared separately. The catalyst solution and MAO (from 0.3 ml to 0.8 ml) was introduced to the reactor through a catalyst tube. The reactor was cooled to 25° C. and vented after polymerization was completed. The polymer was collected by filtration, washed with hexane, dried by $N_2$ purge overnight, and then weighed.

The samples were characterized using $^1$H NMR, DSC, and GPC methods. Samples 14 and 15 showed high productivity in comparison to Samples 11–13.

TABLE 3

| | Sample | | | | |
|---|---|---|---|---|---|
| | 11 | 12 | 13 | 14 | 15 |
| Catalyst | A (0.35 mg) | B (0.35 mg) | Q (0.35 mg) | A (0.175 mg) + Q (0.35 mg) | B (0.175 mg) + Q (0.35 mg) |
| Yield (g) | 0.2 | 0.2 | 1.5 | 171 | 132 |
| Catalyst Productivity (g polymer/g cat/hr.) | 571 | 571 | 4286 | 325714 | 251429 |
| Vinyl % | 26 | 47 | 33 | 50 | 19 |
| GPC-DRI | | | | | |
| $M_w$ (kDaltons) | 19 | 31 | 266 | 497 | 1799 |
| $M_n$ (kDaltons) | 11 | 17 | 111 | 37 | 141 |
| PD | 1.6 | 1.8 | 2.4 | 13.6 | 12.8 |
| GPC-VIS | | | | | |
| $M_w$ (kDaltons) | ND | ND | 321 | 488 | 845 |
| $M_n$ (kDaltons) | ND | ND | 126 | 12 | 66 |
| PD | ND | ND | 2.5 | 41 | 12.7 |
| DSC | | | | | |
| $T_m$ (° C.) | 85 | 135 | 155 | 155 | 152 |
| $T_c$ (° C.) | 66 | 100 | 106 | 108 | 107 |

What is claimed is:

1. A process for preparing a unimodal polymer composition comprising:
   (a) combining a first metallocene catalyst compound comprising a zirconium or hafnium with propylene monomers in a polymerization medium;
   (b) conducting polymerization of the propylene monomers in the polymerization medium with the first metallocene catalyst compound to form vinyl, vinylene or vinylidene terminated polypropylene macromer with a weight average molecular weight of less than 100,000 Daltons;
   (c) combining a second metallocene catalyst compound comprising a zirconium or hafnium with the polymerization medium;
   (d) conducting polymerization of the propylene monomers in the polymerization medium with the second metallocene catalyst compound to form a crystalline polypropylene with a weight average molecular weight of 100,000 Daltons or more;
   (e) incorporating at least some of the vinyl, vinylene or vinylidene terminated polypropylene macromers into the crystalline polypropylene to form a branched crystalline polypropylene polymer; and
   (f) recovering the branched crystalline polypropylene polymer from the polymerization medium,
   wherein the first metallocene catalyst compound is a bridged metallocene compound with at least two indenyl or tetrahydroindenyl rings substituted at one or both of the 4 and 7 positions and the second metallocene catalyst compound is a bridged metallocene compound that has at least two indenyl or tetrahydroindenyl rings substituted at the 2 and 4 positions; and
   wherein the molar amount of the second metallocene catalyst compound is greater than the molar amount of the first metallocene catalyst compound.

2. The process of claim 1 wherein the polymerization medium has less than 20 volume percent diluent.

3. The process of claim 1 wherein the vinyl, vinylene or vinylidene terminated polypropylene macromer consists of at least 30% vinyl terminated polypropylene macromer.

4. The process of claim 1, wherein the branched crystalline polypropylene polymer has a Branching Index of 0.98 or less.

5. The process of claim 1, wherein the branched crystalline polypropylene polymer consists of 97 weight percent or more units derived from propylene monomer.

6. The process of claim 1, wherein the branched crystalline polypropylene polymer consists of from 0.0 weight percent to 0.01 weight percent units derived from alpha omega diene monomer.

7. The process of claim 1, wherein the polymerization medium comprises 30 volume percent or more propylene monomers before the first polymerization step.

8. The process of claim 1, wherein the molar amount of the second metallocene catalyst compound in the polymerization mixture is greater than the molar amount of the first metallocene catalyst compound in the polymerization mixture.

9. The process of claim 1, wherein the second metallocene catalyst compound is present in the polymerization mixture in a molar amount of at least three times that of the molar amount of the first metallocene catalyst compound.

10. The process of claim 1, wherein the polymerization mixture comprises 30 volume percent or more propylene monomers before the first polymerization step.

11. The process of claim 1, wherein the polymerization mixture comprises 70 volume percent or more propylene monomers before the first polymerization step.

* * * * *